(12) United States Patent
Hamagishi

(10) Patent No.: US 7,561,331 B2
(45) Date of Patent: Jul. 14, 2009

(54) IMAGE DISPLAY

(75) Inventor: Goro Hamagishi, Toyonaka (JP)

(73) Assignee: Epson Imaging Devices Corporation, Tokyo (JP)

( * ) Notice: Subject to any disclaimer, the term of this patent is extended or adjusted under 35 U.S.C. 154(b) by 280 days.

(21) Appl. No.: 11/377,392

(22) Filed: Mar. 17, 2006

(65) Prior Publication Data

US 2006/0209407 A1    Sep. 21, 2006

(30) Foreign Application Priority Data

Mar. 17, 2005    (JP) .............................. 2005-076203

(51) Int. Cl.
*G02B 27/26* (2006.01)
(52) U.S. Cl. .......................... 359/465; 359/463; 348/58
(58) Field of Classification Search ................ None
See application file for complete search history.

(56) References Cited

U.S. PATENT DOCUMENTS

| | | | |
|---|---|---|---|
| 5,875,055 A | 2/1999 | Morishima et al. | |
| 2003/0048237 A1 | 3/2003 | Sato et al. | |
| 2003/0107805 A1 | 6/2003 | Street | |

FOREIGN PATENT DOCUMENTS

| | | |
|---|---|---|
| EP | 0 788 008 A1 | 8/1997 |
| EP | 0 935 154 A2 | 8/1999 |
| GB | 2 410 570 A | 8/2005 |
| JP | 3-119889 A | 5/1991 |
| JP | 7-181429 A | 7/1995 |
| JP | 10-123461 A | 5/1998 |
| JP | 2857429 | 11/1998 |
| JP | 2902958 | 3/1999 |
| JP | 2000-197073 | 7/2000 |
| JP | 3452472 | 7/2003 |
| JP | 2004-139054 | 5/2004 |

OTHER PUBLICATIONS

EPC Search Report, May 31, 2006.
European Search Report issued in Corresponding European Patent Application No. 07006471.2-2202, dated on Jun. 19, 2007.

*Primary Examiner*—Lee Fineman
(74) *Attorney, Agent, or Firm*—McDermott Will & Emery LLP

(57) ABSTRACT

An image display includes polarization axis control means for separating light irradiated from a light source into light having a first polarization axis and another light having a second polarization axis different from the first polarization axis and a lens advancing the light having the first polarization axis and the light having the second polarization axis separated by the polarization axis control portion to have different polarization axes in prescribed directions respectively and including at least one lens portion formed to extend in a first direction intersecting with a line segment connecting the left and right eyes of an observer with each other.

14 Claims, 15 Drawing Sheets

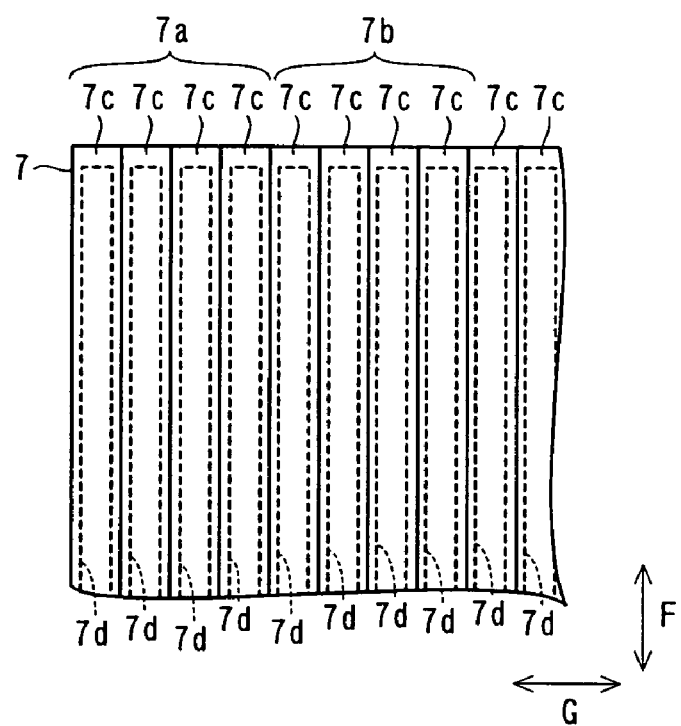
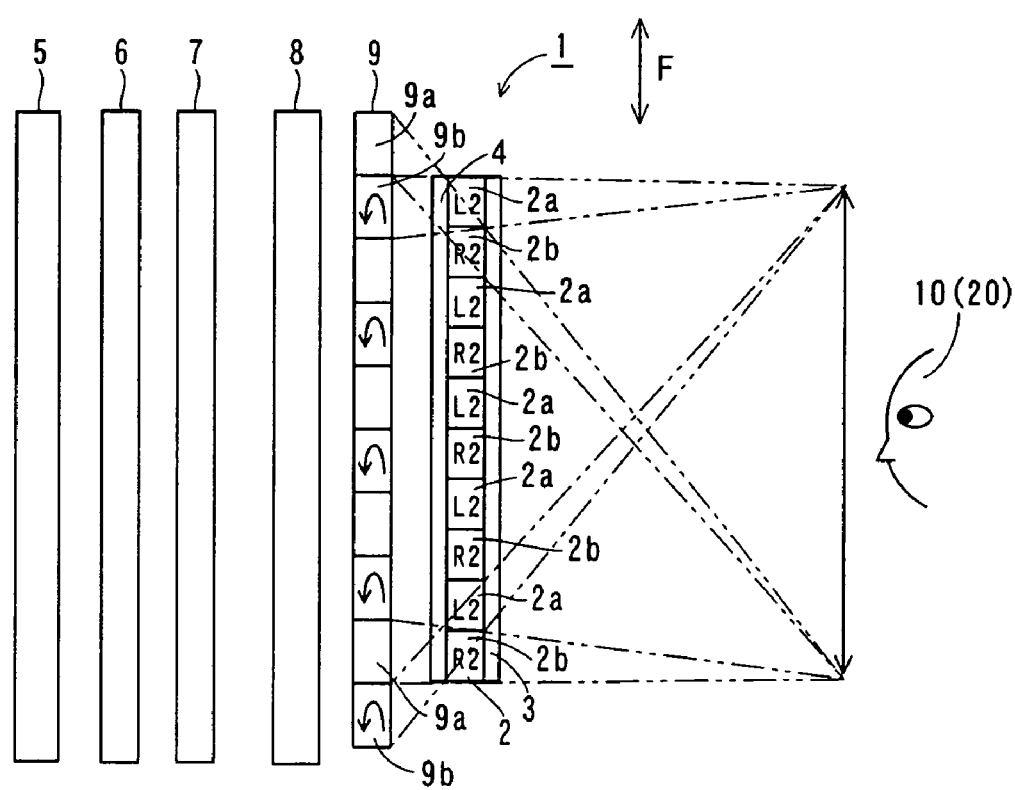

LIGHT HAVING SECOND POLARIZATION AXIS ADVANCING TOWARD OBSERVER 20

LIGHT HAVING FIRST POLARIZATION AXIS ADVANCING TOWARD OBSERVER 10

IMAGE DISPLAY

BACKGROUND OF THE INVENTION

1. Field of the Invention

The present invention relates to an image display, and more particularly, it relates to an image display providing different images or the like to observers located on different observational positions.

2. Cross-Reference to Related Applications

The priority application No. JP2005-76203 upon which this patent application is based is hereby incorporated by reference.

3. Description of the Background Art

A stereoscopic image display displaying three-dimensional stereoscopic images and a two-screen display presenting different images to observers positioned on different observational positions are known in general. Further, a parallax barrier system is generally proposed as a technique for the stereoscopic image display displaying three-dimensional stereoscopic images, as disclosed in Japanese Patent No. 2857429, for example. The aforementioned Japanese Patent No. 2857429 discloses a three-dimensional image display capable of forming openings and shields of prescribed shapes on prescribed positions of an electronic parallax barrier arranged on the side of an image display surface closer to an observer in the form of stripes by controlling the electronic parallax barrier with control means such as a microcomputer. In order to provide three-dimensional images to the observer, the three-dimensional image display disclosed in Japanese Patent No. 2857429 forms the openings of the electronic parallax barrier to introduce left- and right-eye images into the left and right eyes of the observer respectively. In order to provide two-dimensional (planar) images to the observer, on the other hand, the three-dimensional image display introduces all images into both eyes of the observer by controlling the electronic parallax barrier to open the overall area thereof.

A two-screen display capable of presenting different images to observers located on different observational positions by arranging a barrier provided with slitlike openings and shields on the side of a display panel closer to the observers is also proposed in general. FIG. 26 is a plan view for illustrating the principle of an exemplary conventional two-screen display 500. The structure of the conventional two-screen display 500 according to a barrier system is now described with reference to FIG. 26.

As shown in FIG. 26, the conventional two-screen display 500 according to the barrier system comprises a display panel 501 for displaying images, a polarizing plate 502 arranged on a side of the display panel 501 closer to observers 510 and 520 and a barrier 503 provided on a side of the polarizing plate 502 closer to the observes 510 and 520.

The display panel 501 is alternately provided with pixel trains 501a and 501b extending in a direction (perpendicular to the plane of FIG. 26) substantially perpendicular to a line segment connecting left and right eyes 510a and 510b (520a and 520b) of the observer 510 (520) with each other. The display panel 501 is also provided with a glass substrate 501c of glass (refractive index n1=about 1.53) having a thickness A (about 0.5 mm). The display 500 displays images L1 and R1 to be observed by the observers 510 and 520 on the pixel trains 501a and 501b respectively. The pixel trains 501a and 501b are at a pixel pitch B (about 0.06 mm). The polarizing plate 502 of resin (refractive index n2=about 1.49) has a thickness C (about 0.1 mm).

The barrier 503 is provided with shields 503a and openings 503b for blocking and transmitting light received from the display panel 501 respectively. The shields 503a and the openings 503b extend in the direction (perpendicular to the plane of FIG. 26) substantially perpendicular to the line segment connecting the left and right eyes 510a and 510b (520a and 520b) of the observer 510 (520) with each other, similarly to the pixel trains 501a and 501b of the display panel 501. The shields 503a and the openings 503b are provided in correspondence to sets of the pixel trains 501a and 501b of the display panel 501 respectively. The barrier 503 has a function of limiting the angle of light emitted from the pixel trains 501a and 501b of the display panel 501 with the shields 503a thereof.

A two-screen display method according to the conventional two-screen display 500 is now described with reference to FIG. 26.

When observing the display panel 501 of the conventional two-screen display 500 through the openings 503b of the barrier 503 from a position separated from the display panel 501 by an observational distance D (about 600 mm), the observer 510 observes the images L1 displayed on the pixel trains 501a of the display panel 501. When observing the display panel 501 through the openings 503b of the barrier 503 from another position separated from the display panel 501 by the observational distance D (about 600 mm), the observer 520 observes the images R1 displayed on the pixel trains 501b of the display panel 501. Thus, the observers 510 and 520 located on different observational positions can observe different images in an observational range E respectively.

In the conventional two-screen display 500 shown in FIG. 26, the observational range E of the observers 510 and 520 satisfies the following expression (1) through similarity between triangles 550 and 560:

$$D:(C/n2)+(A/n1)=E:B \quad (1)$$

This expression (1) is transformed into the following expression (2) for obtaining the observational range E:

$$E=(B \times D)/\{(C/n2)+(A/(n1))\} \quad (2)$$

It is understood from this expression (2) that the observational range E is proportional to (dependent upon) the pixel pitch B of the display panel 501. When the values B=0.06 mm, D=600 mm, C=0.1 mm, A=0.5 mm, n1=1.53 and n2=1.49 are substituted in the above expression (2), the observational range E is equal to 91.4 (mm). In other words, the observational range E of the observers 510 and 520 is about 91.4 mm (9.14 cm) in the conventional two-screen display 500 shown in FIG. 26 employing the display panel 501 having the pixel pitch B (about 0.06 mm).

In the conventional two-screen display 500 shown in FIG. 26, however, the observational range E proportional to (dependent upon) the pixel pitch B of the display panel 501 is disadvantageously reduced if the pixel pitch B is reduced. If the pixel pitch B of the display panel 501 is smaller than 0.06 mm, for example, the observational range E of the observers 510 and 520 is also smaller than 9.14 cm, and hence it is difficult for the observers 510 and 520 to observe the images L1 and R1. In the conventional two-screen display 500 shown in FIG. 26, therefore, it is difficult to employ a high-definition display panel having a small pixel pitch. Consequently, it is difficult to provide high-definition images to the observers 510 and 520 located on different observational positions.

Further, the shields 503a of the barrier 503 disadvantageously partially block the light received from the display panel 501 since the barrier 503 is arranged on the side of the display panel 501 closer to the observers 510 and 520. Consequently, the images L1 and R1 observed by the observers 510 and 520 disadvantageously appear dark due to reduction of brightness thereof.

In the three-dimensional image display disclosed in the aforementioned Japanese Patent No. 2857429, the shields of the electronic parallax barrier arranged on the side of the image display surface closer to the observer disadvantageously partially block light emitted from an image display surface. Consequently, the images observed by the observer disadvantageously appear dark due to reduction of brightness thereof.

SUMMARY OF THE INVENTION

The present invention has been proposed in order to solve the aforementioned problems, and an object of the present invention is to provide an image display enabling observers located on different observational positions to observe different high-definition images without reducing brightness of the images observed by the observers.

In order to attain the aforementioned object, an image display according to an aspect of the present invention comprises a display panel for displaying images, a light source for irradiating light toward the display panel, polarization axis control means arranged between the light source and the display panel for separating the light irradiated from the light source into light having a first polarization axis and another light having a second polarization axis different from the first polarization axis and a lens, arranged between the polarization axis control means and the display panel for advancing the light having the first polarization axis and the light having the second polarization axis separated by the polarization axis control means in prescribed directions respectively, including at least one lens portion formed to extend in a first direction intersecting with a line segment connecting the left and right eyes of an observer with each other.

The image display according to this aspect, having the polarization axis control means provided between the light source and the display panel for separating the light irradiated from the light source into the light having the first polarization axis and the light having the second polarization axis different from the first polarization axis and the lens provided between the polarization axis control means and the display panel for advancing the light having the first polarization axis and the light having the second polarization axis in the prescribed directions respectively as hereinabove described, can separate the light irradiated from the light source toward observers located on different observational positions before introducing the same into the display panel. Thus, the image display can provide different high-definition images to the observers located on different observational positions by advancing the light toward the observers regardless of the pixel pitch of the display panel also when the display panel is formed by a high-definition panel having a small pixel pitch. Further, the image display, provided with the lens for advancing the light separated by the polarization axis control means to have different polarization axes in the prescribed directions respectively not to block the light advanced toward the observers dissimilarly to a case of advancing the light emitted from the display panel through a member limiting the same toward a direction of a prescribed angle, can suppress reduction of brightness of the light advanced toward the observers. Thus, the image display can inhibit the images from appearing dark.

In the image display according to the aforementioned aspect, the polarization axis control means is preferably provided with a first polarization control area for emitting the light having the first polarization axis and a second polarization control area for emitting the light having the second polarization axis different from the first polarization axis, both extending in the first direction alternately in a second direction intersecting with the first direction, and the lens preferably includes a first lenticular lens provided with a substantially semicylindrical first lens portion formed to extend in the first direction in correspondence to a set of the first polarization control area and the second polarization control area for advancing the light having the first polarization axis emitted from the first polarization control area and the light having the second polarization axis emitted from the second polarization control area in the prescribed directions respectively. According to this structure, the image display, capable of separating the light into the light having the first polarization axis and the light having the second polarization axis to be directed toward observers located on different observational positions through the first lens portion of the first lenticular lens, can easily provide different images to the observers located on different observational positions.

The image display according to the aforementioned aspect preferably further comprises a first retardation plate arranged between the display panel and the lens and provided with a third polarization control area for emitting light having a third polarization axis and a fourth polarization control area for emitting light having a fourth polarization axis different from the third polarization axis, both extending in a second direction intersecting with the first direction alternately in the first direction, while the display panel is preferably provided with a first pixel train and a second pixel train both extending in the second direction alternately in the first direction and the third polarization control area and the fourth polarization control area of the first retardation plate extending in the second direction are preferably provided to correspond to the first pixel train and the second pixel train of the display panel extending in the second direction respectively. According to this structure, the image display can introduce light transmitted through the third polarization control area of the first retardation plate into the first pixel train of the display panel and advance the same toward a first observer in a state holding image information displayed on the display panel. The image display can also introduce light transmitted through the fourth polarization control area into the second pixel train of the display panel and advance the same toward a second observer in a state holding the image information displayed on the display panel. Thus, the image display can easily provide different images to observers located on different observational positions.

In the aforementioned image display comprising the first retardation plate, a shielding area is preferably provided between the third polarization control area and the fourth polarization control area of the first retardation plate extending in the second direction. According to this structure, the image display can form an unarrival area where no light transmitted through the second pixel train of the display panel via the third polarization control area of the first retardation plate arrives at the position of the observer with the shielding area of the first retardation plate. Further, the image display can form another unarrival area where no light transmitted through the first pixel train of the display panel via the fourth polarization control area of the first retardation plate arrives at the position of the observer with the shielding area of the first retardation plate. On these unarrival areas, first and second observers can observe only images for the first and second observers respectively. Consequently, the image display can inhibit the images for the second and first observers from entering the eyes of the first and second observers respectively.

In this case, a shielding member is preferably provided between the first pixel train and the second pixel train of the display panel. According to this structure, the image display can enlarge the light unarrival area where no light transmitted through the second pixel train of the display panel via the third polarization control area of the first retardation plate arrives at the position of the observer with the shielding area of the first retardation plate and the shielding member of the display panel. The image display can also enlarge the other unarrival area where no light transmitted through the first pixel train of the display panel via the fourth polarization control area of the first retardation plate arrives at the position of the observer with the shielding area of the first retardation plate and the shielding member of the display panel. On these enlarged unarrival areas, the first and second observers can observe only the images for the first and second observers respectively. Consequently, the image display can more effectively inhibit the images for the second and first observers from entering the eyes of the first and second observers respectively.

In the image display according to the aforementioned aspect, the polarization axis control means preferably includes a polarization control liquid crystal panel provided with a first polarization control area for emitting the light having the first polarization axis and a second polarization control area for emitting the light having the second polarization axis different from the first polarization axis, both extending in the first direction alternately in a second direction intersecting with the first direction. According to this structure, the image display can transmit the light received from the light source through the polarization control liquid crystal panel without changing the polarization axis thereof through liquid crystals located on the first polarization control area of the polarization control liquid crystal panel. Further, the image display can transmit the light received from the light source through the polarization control liquid crystal panel while changing the polarization axis thereof through liquid crystals located on the second polarization control area of the polarization control liquid crystal panel. Thus, the image display can easily control the polarization axis of the light irradiated from the light source.

In this case, the polarization control liquid crystal panel is preferably provided with a plurality of electrodes for controlling the first polarization control area and the second polarization control area of the polarization control liquid crystal panel, and the image display preferably switches a two-screen display for a planar image and a stereoscopic image display mode by controlling application states on the plurality of electrodes of the polarization control liquid crystal panel thereby controlling an arrival area of the light irradiated from the light source. According to this structure, the image display can control the lengths of the first and second polarization control areas along the second direction by controlling voltage application states on the electrodes when each of the first and second polarization control areas is constituted of a plurality of electrodes. Thus, the image display, capable of setting the first and second polarization control areas to arbitrary lengths along the second direction, can subdivide the first and second polarization control areas. Thus, the image display can subdivide the arrival area of the light by introducing the light irradiated from the light source into the lens through the subdivided first and second polarization control areas. Therefore, the image display, capable of subdividing the arrival area of the light to correspond to the right and left eyes of a plurality of observers respectively, can introduce images having binocular parallax into the right and left eyes of the plurality of observers. Thus, the image display can provide stereoscopic images to a plurality of observers located on different observational positions.

The aforementioned image display controlling the application states on the plurality of electrodes of the polarization control liquid crystal panel preferably further comprises a first retardation plate arranged between the display panel and the lens and provided with a third polarization control area for emitting light having a third polarization axis and a fourth polarization control area for emitting light having a fourth polarization axis different from the third polarization axis, both extending in the second direction alternately in the first direction, while the display panel is preferably provided with a first pixel train and a second pixel train both extending in the second direction alternately in the first direction to correspond to the third polarization control area and the fourth polarization control area of the first retardation plate respectively, and the image display preferably controls the polarization control liquid crystal panel to provide a planar image to the observer by controlling application states on the plurality of electrodes of the polarization control liquid crystal panel thereby switching the first polarization control area and the second polarization control area of the polarization control liquid crystal panel every 1/n frame period (n: natural number of at least two) of the display panel. According to this structure, the image display can introduce both of planar images displayed on the first and second pixel trains of the display panel respectively into the right eye of the observer while introducing both of images displayed on the second and first pixel trains of the display panel into the left eye of the observer at least in one frame period. Consequently, the image display can provide planar images (two-dimensional images) having small image deterioration to the observer.

In this case, the image display may control the display panel to provide a stereoscopic image to the observer by switching a left-eye image and a right-eye image displayed on a first pixel train and a second pixel train of the display panel every 1/n frame period (n: natural number of at least two) of the display panel in synchronization with switching between the first polarization control area and the second polarization control area of the polarization control liquid crystal panel. According to this structure, the image display can introduce right-eye images displayed on the first and second pixel trains of the display panel respectively and left-eye images displayed on the second and first pixel trains of the display panel respectively into the right and left eyes of the observer respectively at least in one frame period. Thus, the observer, enabled to observe the right-eye and left-eye images displayed on all areas of the display panel with his/her right and left eyes respectively, can observe stereoscopic images having small image deterioration.

In this case, the 1/n frame period is preferably a ½ frame period. According to this structure, the image display can provide first and second images displayed on the first and second pixel trains of the display panel respectively to the observer by ½ frame periods respectively. Thus, the observer can observe the first and second images displayed on the first and second pixel trains of the display panel respectively in one frame period.

The image display according to the aforementioned aspect preferably further comprises a first retardation plate arranged between the display panel and the lens and provided with a third polarization control area for emitting light having a third polarization axis and a fourth polarization control area for emitting light having a fourth polarization axis different from the third polarization axis, both extending in a second direction intersecting with the first direction alternately in the first direction, and a second lenticular lens arranged between the display panel and the first retardation plate and provided with a substantially semicylindrical second lens portion extending in the second direction. According to this structure, the image display can introduce light transmitted through the third polarization control area of the first retardation plate into the first pixel train of the display panel through the second lens portion of the second lenticular lens while introducing light transmitted through the fourth polarization control area of the first retardation plate into the second pixel train of the display panel through the second lens portion of the second lenticular lens. Consequently, the image display can easily suppress provision of images different from those to be observed to each observer.

The image display according to the aforementioned aspect preferably further comprises a first retardation plate arranged between the display panel and the lens and provided with a third polarization control area for emitting light having a third polarization axis and a fourth polarization control area for emitting light having a fourth polarization axis different from the third polarization axis, both extending in a second direction intersecting with the first direction alternately in the first direction, and a barrier arranged between the display panel and the first retardation plate and alternately provided in the first direction with openings and shields extending in the second direction. According to this structure, the image display can inhibit light transmitted through the third polarization control area of the first retardation plate from passing through the second pixel train of the display panel and entering the eyes of the observer while inhibiting light transmitted through the fourth polarization control area of the first retardation plate from passing through the first pixel train of the display panel and entering the eyes of the observer with the shields of the barrier. Consequently, the image display can easily suppress provision of images different from those to be observed to each observer.

In the image display according to the aforementioned aspect, the polarization axis control means preferably includes a polarization control liquid crystal panel provided with a first polarization control area for emitting the light having the first polarization axis and a second polarization control area for emitting the light having the second polarization axis different from the first polarization axis, both extending in the first direction alternately in a second direction intersecting with the first direction, and the image display preferably further comprises position sensing means for sensing the position of the observer and a control portion for moving the first polarization control area and the second polarization control area of the polarization control liquid crystal panel in response to the position of the observer sensed by the position sensing means. According to this structure, the image display, capable of sensing movement of the observer with the position sensing means and moving the first and second polarization control areas of the polarization control liquid crystal panel on the basis of positional information thereof, can provide proper images to the observer also when the observer moves.

In the image display according to the aforementioned aspect, the polarization axis control means may include a second retardation plate provided with a first polarization control area for emitting the light having the first polarization axis and a second polarization control area for emitting the light having the second polarization axis different from the first polarization axis, both extending in the first direction alternately in a second direction intersecting with the first direction. According to this structure, the image display can separate the light irradiated from the light source into those having different polarization axes through the second retardation plate with a simpler structure as compared with a case of employing the polarization control liquid crystal panel as the polarization axis control means.

In the image display according to the aforementioned aspect, the polarization axis control means preferably includes a polarization control liquid crystal panel provided with a first polarization control area for emitting the light having the first polarization axis and a second polarization control area for emitting the light having the second polarization axis different from the first polarization axis, both extending in the first direction alternately in a second direction intersecting with the first direction, and the image display preferably provides different planar images to observers located on different observational positions and provides stereoscopic images to the observers by changing the lengths and the positions of the first polarization control area and the second polarization control area of the polarization control liquid crystal panel in the second direction thereby controlling an arrival position of the light advanced through the first polarization control area and the second polarization control area and the lens. According to this structure, the image display can easily provide different planar images to the observers located on different observational positions by controlling the arrival position of the light to those on which the different observers are located respectively. Further, the image display can provide stereoscopic images to the observers by controlling the arrival position of the light to the positions of the right and left eyes of the observers located on different observational positions respectively by changing the lengths and the positions of the first and second polarization control areas in the second direction.

The aforementioned image display comprising the retardation plate preferably further comprises a first polarizing plate arranged between the first retardation plate and the display panel for transmitting either the light having the third polarization axis or the light having the fourth polarization axis. According to this structure, the image display, capable of transmitting either the light having the third polarization axis or the light having the fourth polarization axis emitted from the retardation plate, can bring only either the light having the third polarization axis or the light having the fourth polarization axis to the observer. Consequently, the image display can easily provide different images to observers located on different observational positions.

The image display according to the aforementioned aspect preferably further comprises a second polarizing plate arranged between the light source and the polarization axis control means for transmitting light having either the first polarization axis or the second polarization axis. According to this structure, the image display can introduce light having either the first polarization axis or the second polarization axis into the polarization axis control means from those having various polarization axes irradiated from the light source. Thus, the image display can separate incident light into light having the first polarization axis and light having the second polarization axis by polarizing only light incident upon either the first polarization control area or the second polarization control area. Consequently, the image display can provide different images to observers located on different observational positions with the light having the first polarization axis and the light having the second polarization axis separated from each other.

In the aforementioned structure having the polarization control liquid crystal panel provided with electrodes, a plurality of electrodes of the polarization control liquid crystal panel extend along the first direction respectively. According to this structure, the image display can be easily provided with the first and second polarization control areas capable of providing the light having the first polarization axis and the light having the second polarization axis respectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a partially fragmented enlarged view of a polarization control liquid crystal panel of the image display according to the first embodiment of the present invention shown in FIG. 1;

FIG. 4 is a diagram showing the display panel observed by an observer from a side portion for illustrating the principle of the image display according to the first embodiment of the present invention shown in FIG. 1;

DESCRIPTION OF THE PREFERRED EMBODIMENTS

Embodiments of the present invention are now described with reference to the drawings.

First Embodiment

The structure of an image display 1 according to a first embodiment of the present invention is described with reference to FIGS. 1 to 5.

Figure 1:
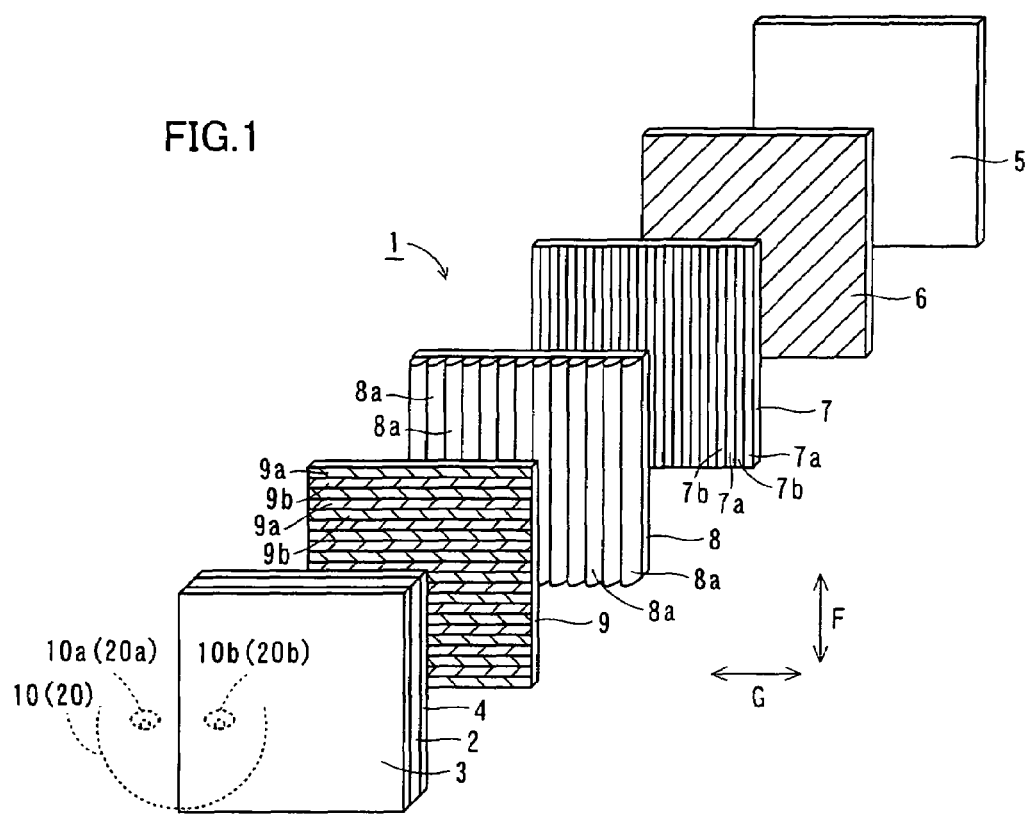
FIG. 1 is an exploded perspective view showing an image display according to a first embodiment of the present invention.
Figure 2:
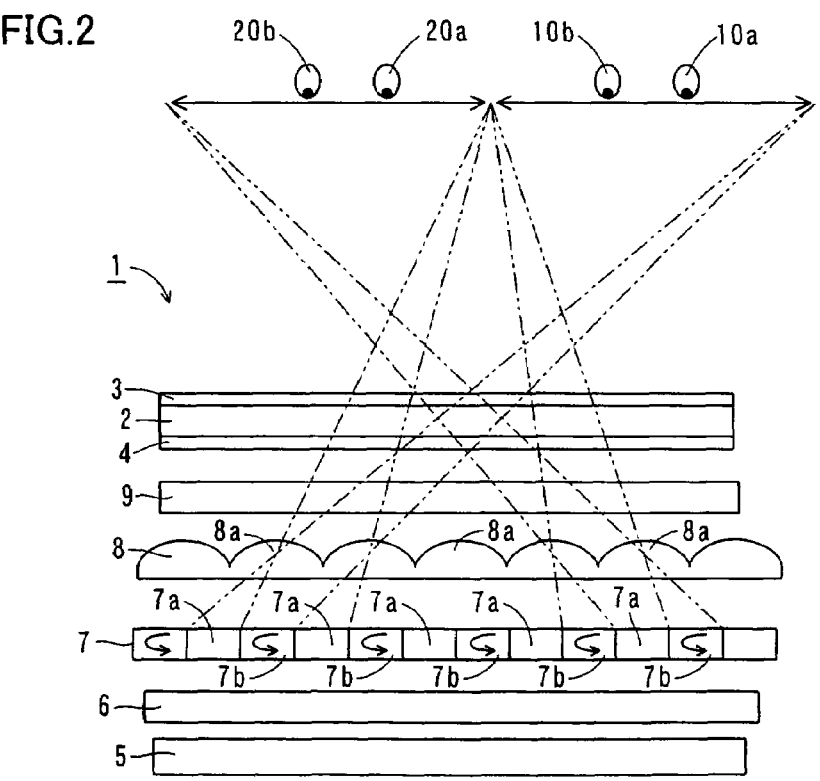
FIG. 2 is a diagram showing a display panel observed by observers from above for illustrating the principle of the image display according to the first embodiment of the present invention shown in FIG. 1.

As shown in FIGS. 1 and 2, the image display 1 according to the first embodiment of the present invention comprises a display panel 2 for displaying images, polarizing plates 3 and 4 arranged to hold the display panel 2 therebetween, a backlight 5 for irradiating light toward the display panel 2 and still another polarizing plate 6 arranged on a side of the backlight 5 closer to observers 10 and 20 (see FIG. 2). The polarizing plates 3 and 4 arranged to hold the display panel 2 therebetween have polarization axes perpendicular to each other. The polarizing plate 4 has a function of transmitting light having a first polarization axis and absorbing light having a second polarization axis substantially perpendicular to the first polarization axis. The polarizing plate 3 has a function of transmitting light having the second polarization axis substantially perpendicular to the first polarization axis and absorbing light having the first polarization axis. The polarizing plate 6 transmits light having the first polarization axis included in the light irradiated from the backlight 5. The backlight 5 is an example of the "light source" in the present invention.

According to the first embodiment, a polarization control liquid crystal panel 7 is arranged on a side of the polarizing plate 6 closer to the observers 10 and 20. This polarization control liquid crystal panel 7 has polarization control areas 7a for transmitting light having the first polarization axis received from the backlight 5 through the polarizing plate 6 and polarization control areas 7b for converting the light having the first polarization axis into light having the second polarization axis substantially perpendicular to the first polarization axis. The polarization control areas 7a and 7b of the polarization control liquid crystal panel 7, extending in a direction (perpendicular to the plane of FIG. 2 (direction F in FIG. 1)) substantially perpendicular to a line segment connecting left and right eyes 10a and 10b (20a and 20b) of the observer 10 (20) with each other, are alternately provided in a direction G. Each of the polarization control areas 7a and 7b is constituted of a plurality of (e.g., four) unit areas 7c (see FIG. 3) of the polarization control liquid crystal panel 7. The unit areas 7c constituting the polarization control areas 7a and 7b of the polarization control liquid crystal panel 7 are provided with electrodes 7d respectively, as shown in FIG. 3. The image display 1 applies voltage to four electrodes 7d corresponding to the four unit areas 7c constituting each polarization control area 7a while applying no voltage to four electrodes 7d corresponding to the four unit areas 7c constituting each polarization control area 7b in a two-screen display mode described later. According to the first embodiment, the image display 1 can arbitrarily change the widths of the polarization control areas 7a and 7b by controlling application/nonapplication of voltage to the electrodes 7d provided on the unit areas 7c. For example, the image display 1 can set each of the polarization control areas 7a and 7b to a width corresponding to two unit areas 7c by constituting each of the polarization control areas 7a and 7b of two unit areas 7c and applying voltage to two electrodes 7d corresponding to the two unit areas 7c constituting each polarization control area 7a while applying no voltage to two electrodes 7d corresponding to the two unit areas 7c constituting each polarization control area 7b in a stereoscopic image display mode and a planar image display mode as described later. Thus, the image display 1 can easily switch between the two-screen display mode, the stereoscopic image display mode and the planar image display mode. The polarization control liquid crystal panel 7 is an example of the "polarization axis control means" in the present invention. The polarization control areas 7a are examples of the "first polarization control area" in the present invention, and the polarization control areas 7b are examples of the "second polarization control area" in the present invention.

According to the first embodiment, a lenticular lens 8 is arranged on a side of the polarization control liquid crystal panel 7 closer to the observers 10 and 20, as shown in FIGS. 1 and 2. A plurality of substantially semicylindrical lens portions 8a are formed on this lenticular lens 8 to extend in a direction F in FIG. 1. The lenticular lens 8 including the plurality of lens portions 8a has a function of advancing light separated by the polarization control liquid crystal panel 7 to have different polarization axes toward the observers 10 and 20 respectively. The lenticular lens 8 is an example of the "lens" or the "first lenticular lens" in the present invention, and the lens portions 8a are examples of the "first lens portion" in the present invention.

Figure 5:
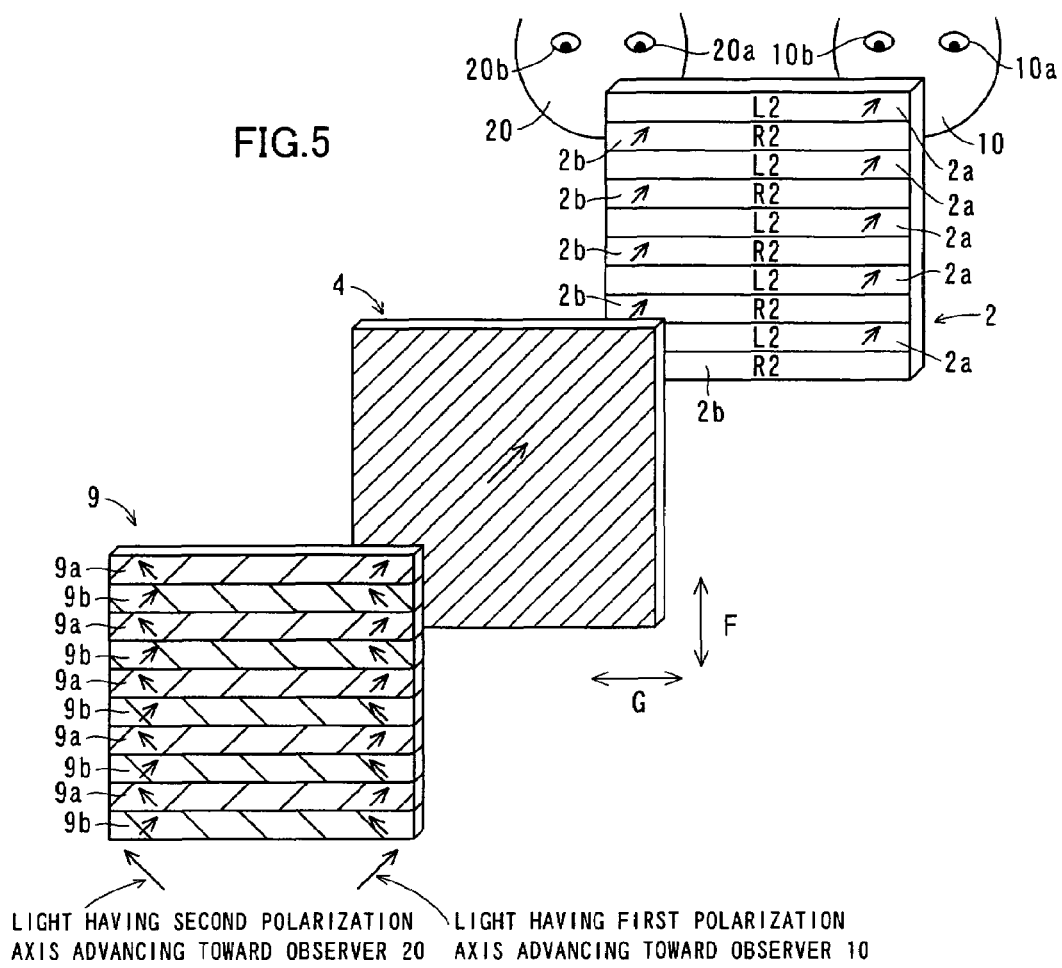
FIG. 5 is an exploded perspective view for illustrating the principle of the image display according to the first embodiment of the present invention shown in FIG. 1.

According to the first embodiment, a retardation plate 9 is arranged between the lenticular lens 8 and the polarizing plate 4 mounted on the display panel 2. This retardation plate 9 includes transmissive areas 9a transmitting light having the first polarization axis and polarizing areas 9b for converting light having the first polarization axis into light having the second polarization axis. The transmissive areas 9a and the polarizing areas 9b, extending in a direction G substantially perpendicular to the direction F, are alternately provided in the direction F, as shown in FIGS. 1 and 5. The retardation plate 9 is an example of the "first retardation plate" in the present invention, the transmissive areas 9a are examples of the "third polarization control area" in the present invention, and the polarizing areas 9b are examples of the "fourth polarization control area" in the present invention.

According to the first embodiment, the display panel 2 is provided with pixel trains 2a and 2b extending in the direction G (see FIG. 5) alternately in the direction F as shown in FIGS. 4 and 5. The pixel trains 2a and 2b of the display panel 2 correspond to the transmissive areas 9a and the polarizing areas 9b of the retardation plate 9 extending in the direction G. The polarizing plate 6, the polarization control liquid crystal panel 7, the lenticular lens 8, the retardation plate 9 and the polarizing plate 4 are arranged between the display panel 2 and the backlight 5, as shown in FIGS. 1 and 2.

(Two-Screen Display Mode)

A two-screen display method of the image display 1 according to the first embodiment of the present invention is now described with reference to FIGS. 2 to 6.

First, structures of the polarization control liquid crystal panel 7 and the display panel 2 for providing different images to the observers 10 and 20 located on different observational positions respectively are described with reference to FIGS. 2, 3 and 5. In the two-screen display mode of the image display 1 according to the first embodiment of the present invention, each set of the polarization control areas 7a and 7b of the polarization control liquid crystal panel 7 is provided in correspondence to each lens portion 8a of the lenticular lens 8, as shown in FIG. 2. In other words, the image display 1 changes application/nonapplication of voltage every four electrodes 7d of the polarization control liquid crystal panel 7 thereby constituting each of the polarization control areas 7a and 7b of the polarization control liquid crystal panel 7 of four unit areas 7c (see FIG. 3) in the two-screen display mode, as hereinabove described. The pixel trains 2a and 2b of the display panel 2 display images L2 (television images, for example) and R2 (car navigation images, for example) to be observed by the observers 10 and 20 respectively, as show in FIG. 5.

In the aforementioned structure, the image display 1 transmits only light having the first polarization axis included in the light received from the backlight 5 through the polarizing plate 6 arranged on the side of the backlight 5 closer to the observers 10 and 20, and advances the same toward the polarization control liquid crystal panel 7. The image display 1 further transmits the light having the first polarization axis through the polarization control areas 7a and 7b of the polarization control liquid crystal panel 7. At this time, the image display 1 transmits the light incident upon the polarization control areas 7a of the polarization control liquid crystal panel 7 without changing the polarization axis thereof, and emits the light incident upon the polarization control areas 7b of the polarization control liquid crystal panel 7 while changing the polarization axis thereof substantially by 90° (to have the second polarization axis). Thereafter the image display 1 condenses the light emitted from the polarization control areas 7a with the first polarization axis through the lenticular lens 8 to advance the same toward the observer 10, as shown in FIG. 2. The image display 1 further condenses the light emitted from the polarization control areas 7b with the second polarization axis substantially perpendicular to the first polarization axis through the lenticular lens 8 to advance the same toward the observer 20.

Figure 6:
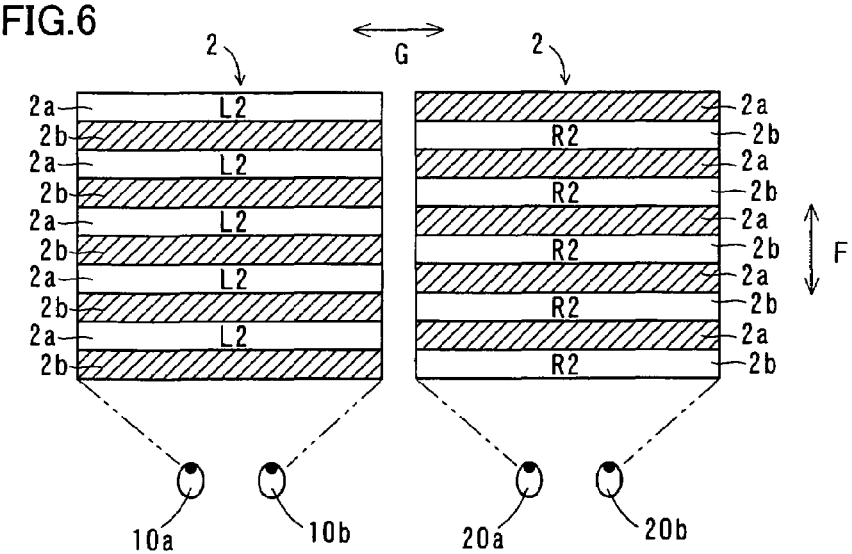
FIG. 6 is a diagram for illustrating areas of the display panel observed by the observers in a two-screen display mode of the image display according to the first embodiment of the present invention shown in FIG. 1.

As shown in FIG. 5, the image display 1 introduces the light advancing toward the observer 10 with the first polarization axis into the retardation plate 9 having the transmissive areas 9a and the polarizing areas 9b. The image display 1 transmits the light having the first polarization axis through the transmissive areas 9a and the polarizing areas 9b of the retardation plate 9. At this time, the image display 1 transmits the light through the transmissive areas 9a of the retardation plate 9 without changing the polarization axis thereof, and emits the light incident upon the polarizing areas 9b while changing the polarization axis substantially by 90° (to have the second polarization axis). Thereafter the image display 1 introduces the light emitted from the transmissive areas 9a of the retardation plate 9 with the first polarization axis into the polarizing plate 4 arranged between the display panel 2 and the retardation plate 9, transmits the same through the polarizing plate 4 as such and introduces the same into the pixel trains 2a of the display panel 2. On the other hand, the image display 1 introduces the light emitted from the polarizing areas 9b of the retardation plate 9 with the second polarization axis substantially perpendicular to the first polarization axis into the polarizing plate 4 arranged between the display panel 2 and the retardation plate 9 to be absorbed therein. Therefore, no light passing through the pixel trains 2b of the display panel 2 displaying the images R2 for the observer 20 approaches the observer 10, so that the observer 10 cannot observe the images R2 displayed on the pixel trains 2b of the display panel 2 for the observer 20. Thus, the observer 10 can observe the images L2 displayed on the pixel trains 2a of the display panel 2 for the observer 10, as shown in FIG. 6.

The image display 1 introduces the light advancing toward the observer 20 with the second polarization axis into the retardation plate 9 having the transmissive areas 9a and the polarizing areas 9b, as shown in FIG. 5. The image display 1 transmits the light having the second polarization axis substantially perpendicular to the first polarization axis through the transmissive areas 9a and the polarizing areas 9b of the retardation plate 9. At this time, the image display 1 transmits the light through the transmissive areas 9a of the retardation plate 9 without changing the polarization axis thereof, and emits the light incident upon the polarizing areas 9b while changing the polarization axis thereof substantially by 90° (to have the first polarization axis). Thereafter the image display 1 introduces the light emitted from the transmissive areas 9a of the retardation plate 9 toward the observer 20 with the second polarization axis substantially perpendicular to the first polarization axis into the polarizing plate 4 arranged between the display panel 2 and the retardation plate 9 to be absorbed. Therefore, no light passing through the pixel trains 2a of the display panel 2 displaying the images L2 for the observer 10 approaches the observer 20, so that the observer 20 cannot observe the images L2 displayed on the pixel trains 2a of the display panel 2 for the observer 10. On the other hand, the image display 1 introduces the light emitted from the polarizing areas 9b of the retardation plate 9 toward the observer 20 with the first polarization axis into the polarizing plate 4 arranged between the display panel 2 and the retardation plate 9, transmits the same through the polarizing plate 4 as such and introduces the same into the pixel trains 2b of the display panel 2. Thus, the observer 20 can observe the images R2 displayed on the pixel trains 2b of the display panel 2 for the observer 20, as shown in FIG. 6.

(Stereoscopic Image Display Mode)

A stereoscopic image display method of the image display 1 according to the first embodiment of the present invention is now described with reference to FIGS. 7 to 9.

First, structures of the polarization control liquid crystal panel 7 and the display panel 2 for providing stereoscopic images to the observers 10 and 20 located on different observational positions respectively are described. As shown in FIG. 7, two sets of the polarization control areas 7a and 7b of the polarization control liquid crystal panel 7 are provided in correspondence to each lens portion 8a of the lenticular lens 8. In other words, the image display 1 changes application/nonapplication of voltage every two electrodes 7d of the polarization control liquid crystal panel 7 thereby constituting each of the polarization control areas 7a and 7b of the polarization control liquid crystal panel 7 of two unit areas 7c (see FIG. 3) in the stereoscopic image display mode as hereinabove described, for switching from the two-screen display mode to the stereoscopic image display mode. As shown in FIG. 8, the image display 1 displays left- and right-eye images L3 and R3 to be introduced into the left eyes 10a and 20a and the right eyes 10b and 20b of the observers 10 and 20 respectively on the pixel trains 2a and 2b of the display panel 2 respectively.

In the aforementioned structure, the image display 1 transmits only light having the first polarization axis included in the light received from the backlight 5 through the polarizing plate 6 arranged on the side of the backlight 5 closer to the observers 10 and 20, to advance the same toward the polarization control liquid crystal panel 7. The image display 1 transmits the light having the first polarization axis through the polarization control areas 7a and 7b of the polarization control liquid crystal panel 7. At this time, the image display 1 transmits the light incident upon the polarization control areas 7a of the polarization control liquid crystal panel 7 without changing the polarization axis thereof, and emits the light incident upon the polarization control areas 7b of the polarization control liquid crystal panel 7 while changing the polarization axis thereof substantially by 90° (to have the second polarization axis). Thereafter the image display 1 condenses the light emitted from the polarization control areas 7a with the first polarization axis through the lenticular lens 8 to advance the same toward the left eyes 10a and 20a of the observers 10 and 20. The image display 1 further condenses the light emitted from the polarization control areas 7b with the second polarization axis substantially perpendicular to the first polarization axis through the lenticular lens 8 to advance the same toward the right eyes 10b and 20b of the observers 10 and 20.

Figure 8:
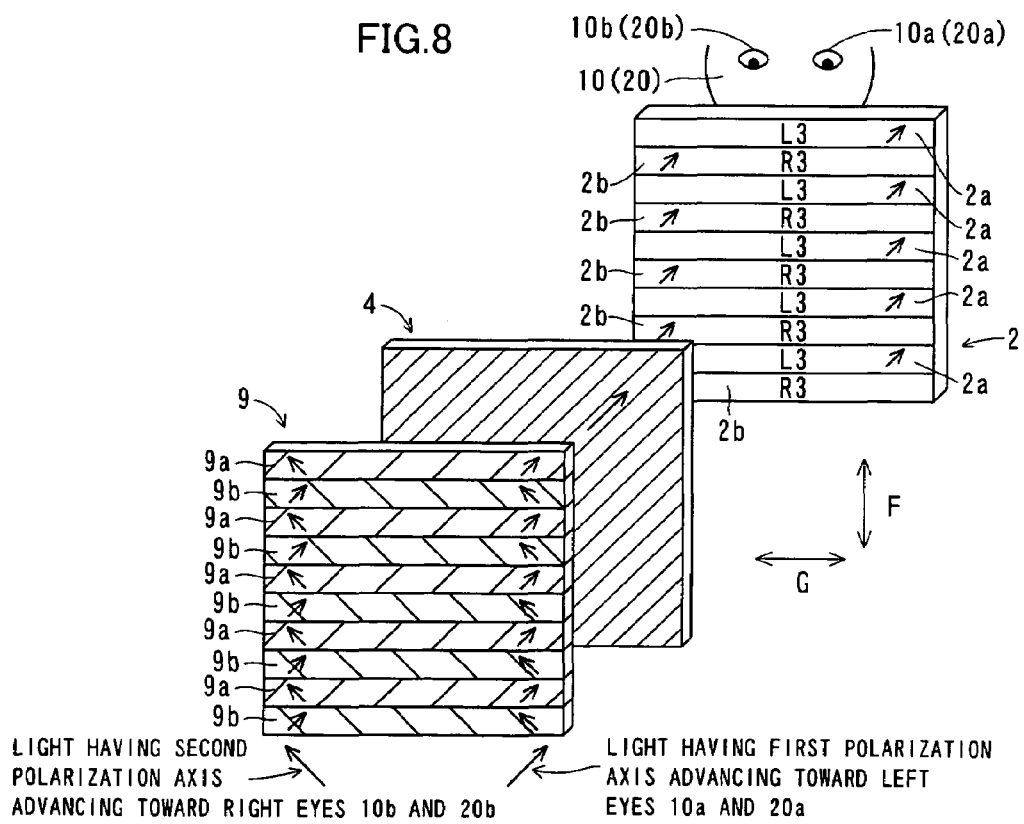
FIG. 8 is an exploded perspective view for illustrating the principle of the stereoscopic image display method of the image display according to the first embodiment of the present invention shown in FIG. 1.
Figure 9:
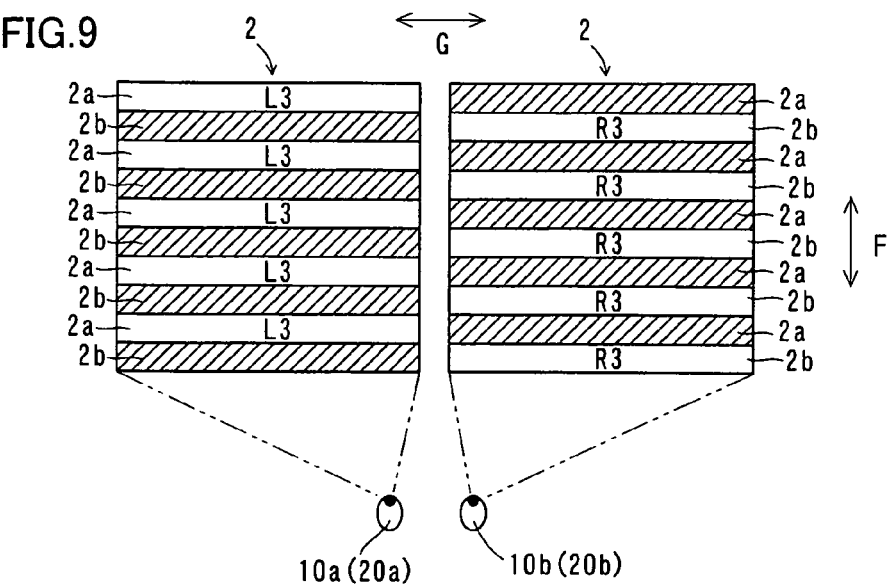
FIG. 9 is a diagram for illustrating areas of the display panel observed by the observers in a stereoscopic image display mode of the image display according to the first embodiment of the present invention shown in FIG. 1.

As shown in FIG. 8, the image display 1 introduces the light advancing toward the left eyes 10a and 20a of the observers 10 and 20 with the first polarization axis into the retardation plate 9 having the transmissive areas 9a and the polarizing areas 9b. The image display 1 transmits the light having the first polarization axis through the transmissive areas 9a and the polarizing areas 9b of the retardation plate 9. At this time, the image display 1 transmits the light through the transmissive areas 9a of the retardation plate 9 without changing the polarization axis thereof, and emits the light incident upon the polarizing areas 9b while changing the polarization axis substantially by 90° (to have the second polarization axis). Thereafter the image display 1 introduces the light emitted from the transmissive areas 9a of the retardation plate 9 with the first polarization axis toward the left eyes 10a and 20a of the observers 10 and 20 into the polarizing plate 4 arranged between the display panel 2 and the retardation plate 9, transmits the same through the polarizing plate 4 as such and introduces the same into the pixel trains 2a of the display panel 2. On the other hand, the image display 1 introduces the light emitted from the polarizing areas 9b of the retardation plate 9 with the second polarization axis substantially perpendicular to the first polarization axis toward the left eyes 10a and 20a of the observers 10 and 20 into the polarizing plate 4 arranged between the display panel 2 and the retardation plate 9 to be absorbed. Therefore, no light passing through the pixel trains 2b of the display panel 2 displaying the right-eye images R3 approach the left eyes 10a and 20a of the observers 10 and 20, so that the left eyes 10a and 20a of the observers 10 and 20 cannot observe the right-eye images R3 displayed on the pixel trains 2b of the display panel 2. Thus, the image display 1 introduces the left-eye images L3 displayed on the pixel trains 2a of the display panel 2 into the left eyes 10a and 20a of the observers 10 and 20, as shown in FIG. 9.

On the other hand, the image display 1 introduces the light advancing toward the right eyes 10b and 20b of the observers 10 and 20 with the second polarization axis into the retardation plate 9 having the transmissive areas 9a and the polarizing areas 9b, as shown in FIG. 8. The image display 1 transmits the light having the second polarization axis through the transmissive areas 9a and the polarizing areas 9b of the retardation plate 9. At this time, the image display 1 transmits the light through the transmissive areas 9a of the retardation plate 9 without changing the polarization axis thereof, and emits the light incident upon the polarizing areas 9b while changing the polarization axis thereof substantially by 90° (to have the second polarization axis). Thereafter the image display 1 introduces the light emitted from the transmissive areas 9a of the retardation plate 9 with the second polarization axis toward the right eyes 10b and 20b of the observers 10 and 20 into the polarizing plate 4 arranged between the display panel 2 and the retardation plate 9, to be absorbed. Therefore, no light passing through the pixel trains 2a of the display panel 2 displaying the left-eye images L3 approach the right eyes 10b and 20b of the observers 10 and 20, so that the right eyes 10b and 20b of the observers 10 and 20 cannot observe the left-eye images L3 displayed on the pixel trains 2a of the display panel 2. On the other hand, the image display 1 introduces the light emitted from the polarizing areas 9b of the retardation plate 9 with the first polarization axis toward the right eyes 10b and 20b of the observers 10 and 20 into the polarizing plate 4 arranged between the display panel 2 and the retardation plate 9, transmits the same through the polarizing plate 4 as such and introduces the same into the pixel trains 2b of the display panel 2. Thus, the image display 1 introduces the right-eye images R3 displayed on the pixel trains 2b of the display panel 2 into the right eyes 10b and 20b of the observers 10 and 20, as shown in FIG. 9. As hereinabove described, the observers 10 and 20 receiving the left- and right-eye images L3 and R3 having binocular parallax in the left eyes 10a and 20a and the right eyes 10b and 20b respectively can observe stereoscopic images.

(Planar Image Display Method with Small Image Deterioration)

Figure 10:
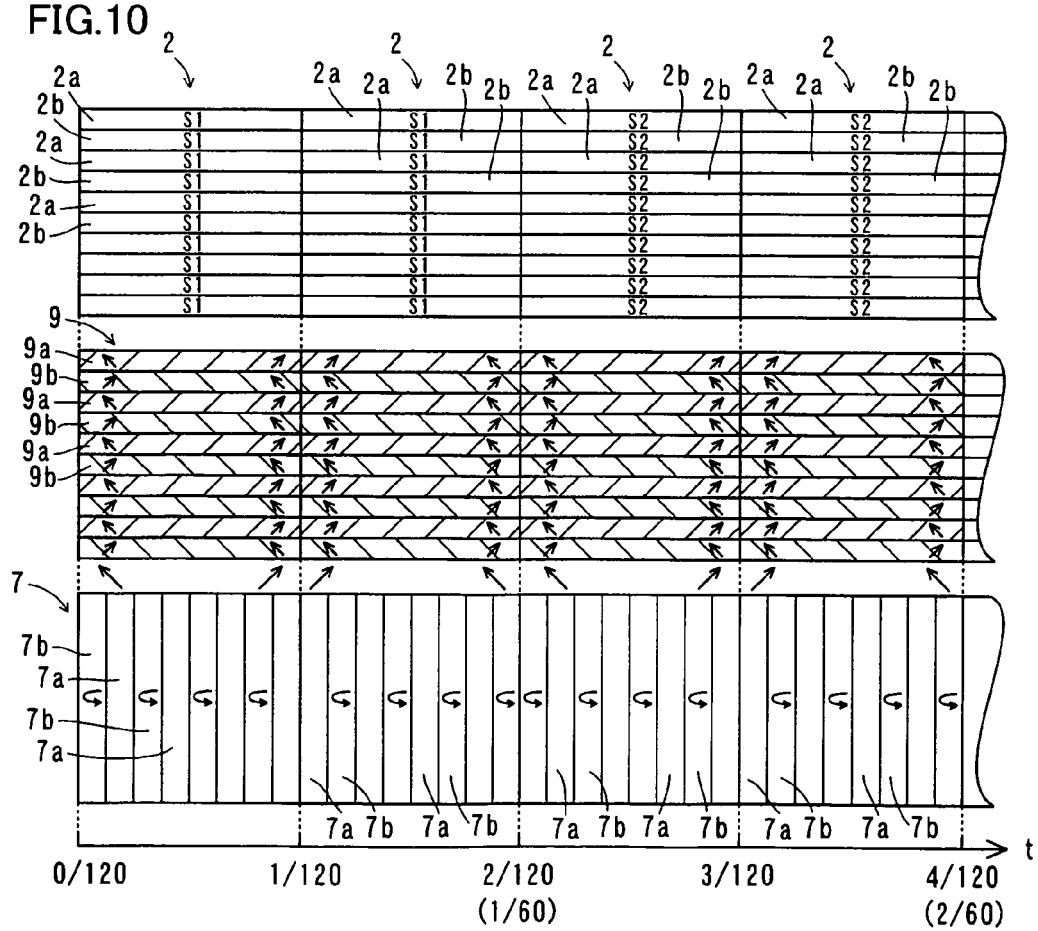
FIG. 10 illustrates the polarization control liquid crystal panel, a retardation plate and the display panel in a planar image display mode of the image display according to the first embodiment of the present invention shown in FIG. 1.
Figure 11:
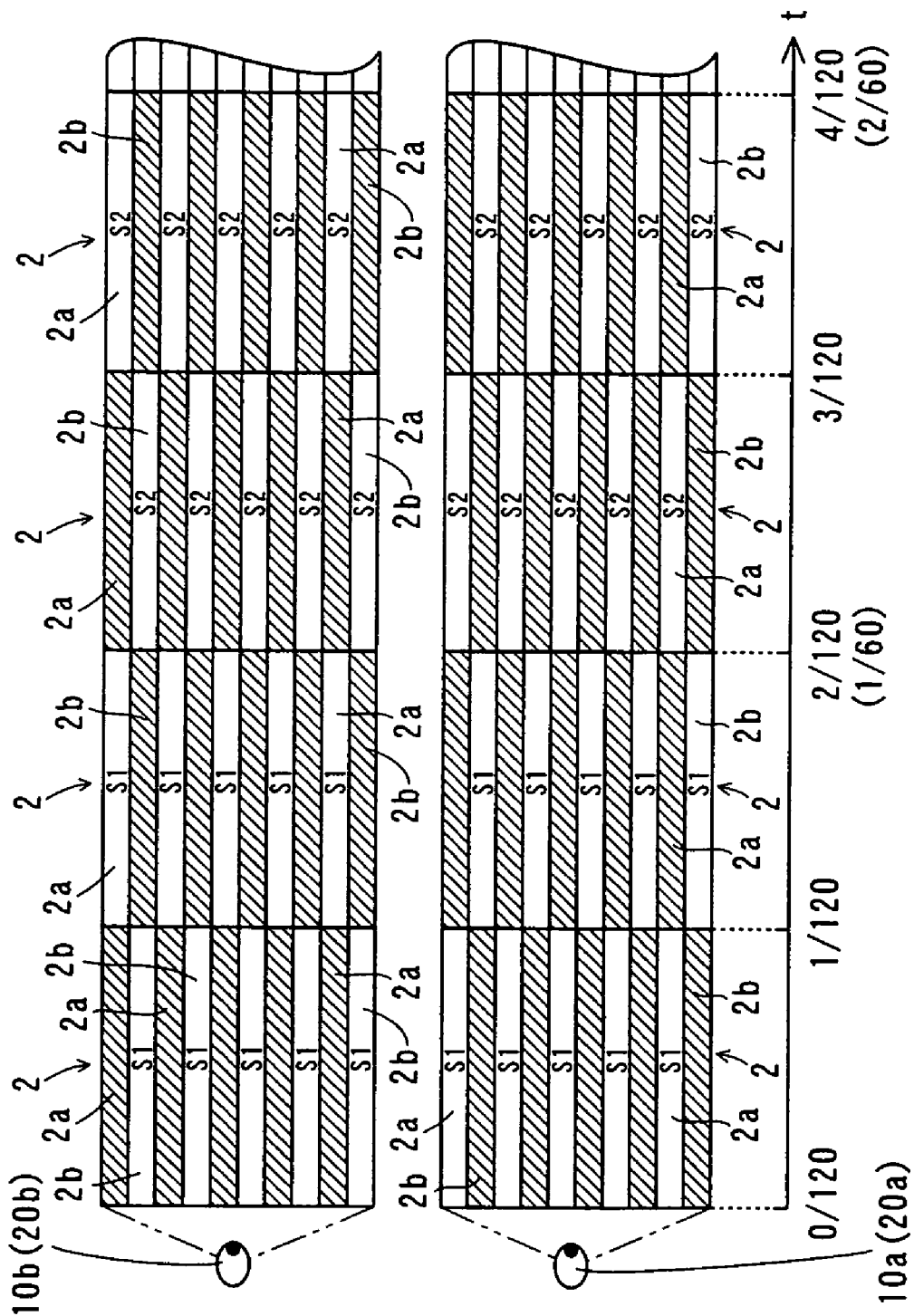
FIG. 11 is a diagram for illustrating areas of the display panel observed by the observers in the planar image display mode of the image display according to the first embodiment of the present invention shown in FIG. 1.

A planar image display method of the image display 1 according to the first embodiment of the present invention is now described with reference to FIGS. 7, 10 and 11.

First, structures of the polarization control liquid crystal panel 7 and the display panel 2 for providing planar images to the observers 10 and 20 located on different observational positions respectively are described. Two sets of the polarization control areas 7a and 7b of the polarization control liquid crystal panel 7 are provided in correspondence to each lens portion 8a of the lenticular lens 8, similarly to the case of the stereoscopic image display mode shown in FIG. 7. In other words, the image display 1 changes application/nonapplication of voltage every two electrodes 7d of the polarization control liquid crystal panel 7 as described above in the planar image display mode with small image deterioration, thereby constituting each of the polarization control areas 7a and 7b of the polarization control liquid crystal panel 7 of two unit areas 7c (see FIG. 3). As shown in FIG. 10, the display panel 2 displays planar images S1 in a period between $0/120$ and $2/120$ seconds, and displays planar images S2 in a period between $2/120$ and $4/120$ seconds. The display panel 2 thereafter successively displays planar images every $1/60$ seconds.

In the planar image display mode, the image display 1 according to the first embodiment controls application states on the electrodes 7d thereby switching the polarization control areas 7a and 7b of the polarization control liquid crystal panel 7 every ½ frame period ($1/120$ seconds) of the display panel 2. In the aforementioned structure, the image display 1 introduces the planar images S1 displayed on the pixel trains 2a of the display panel 2 into the left eyes 10a and 20a of the observers 10 and 20 in a period between $0/120$ and $1/120$ seconds, as shown in FIGS. 10 and 11. At this time, the image display 1 introduces the planar images S1 displayed on the pixel trains 2b of the display panel 2 into the right eyes 10b and 20b of the observers 10 and 20. The image display 1 switches the polarization control areas 7a and 7b of the polarization control liquid crystal panel 7 in a period between $1/120$ and $2/120$ seconds, thereby directing the light advancing toward the left eyes 10a and 20a of the observers 10 and 20 toward the retardation plate 9 while changing the polarization axis thereof substantially by 90° by transmitting the same through the polarization control areas 7b of the polarization control liquid crystal panel 7. Therefore, the image display 1 introduces the planar images S1 displayed on the pixel trains 2b of the display panel 2 into the left eyes 10a and 20a of the observers 10 and 20 while introducing the planar images S1 displayed on the pixel trains 2a of the display panel 2 into the right eyes 10b and 20b of the observers 10 and 20 in the period between $1/120$ and $2/120$ seconds, as shown in FIG. 11.

In a period between $2/120$ and $3/120$ seconds, the image display 1 introduces the planar images S2 displayed on the pixel trains 2a of the display panel 2 into the left eyes 10a and 20a of the observers 10 and 20 while introducing the planar images S2 displayed on the pixel trains 2b of the display panel 2 into the right eyes 10b and 20b of the observers 10 and 20, similarly to the period between $0/120$ and $1/120$ seconds. In a period between $3/120$ and $4/120$ seconds, the image display 1 introduces the planar images S2 displayed on the pixel trains 2b of the display panel 2 into the left eyes 10a and 20a of the observers 10 and 20 while introducing the planar images S2 displayed on the pixel trains 2a of the display panel 2 into the right eyes 10b and 20b of the observers 10 and 20, similarly to the period between $1/120$ and $2/120$ seconds. Thus, the image display 1, capable of introducing the planar images S displayed on the overall areas of the display panel 2 in $2/120$ seconds ($1/60$ seconds), can provide planar images having small image deterioration to the observers 10 and 20.

(Image Deterioration Suppression in Stereoscopic Image Display Mode)

A stereoscopic image display method with small image deterioration in an image display 1 according to a modification of the first embodiment of the present invention is now described with reference to FIGS. 7, 12 and 13.

Figure 7:
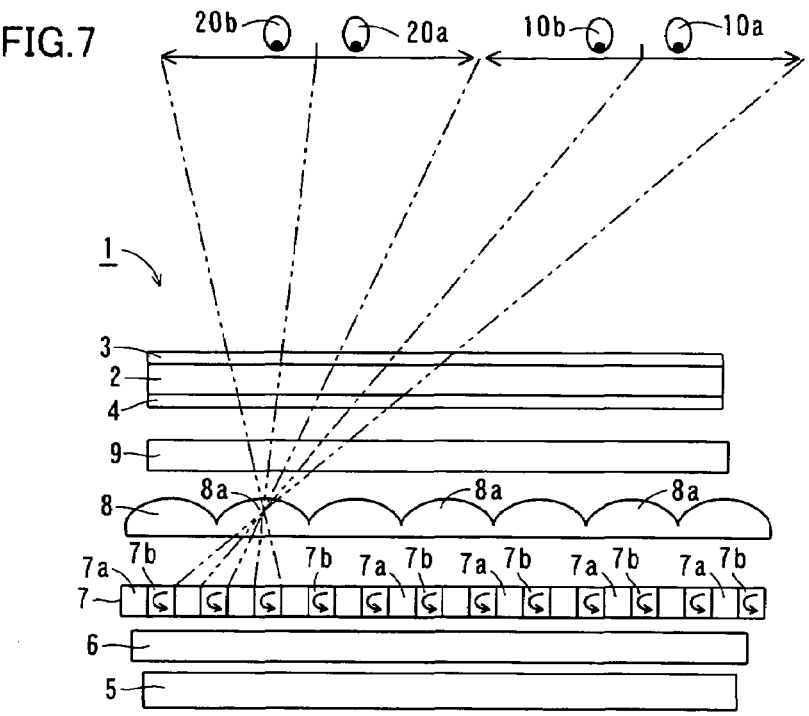
FIG. 7 is a diagram showing the display panel observed by the observers from above for illustrating the principle of a stereoscopic image display method of the image display according to the first embodiment of the present invention shown in FIG. 1.

In the image display 1 according to the modification of the first embodiment, two sets of polarization control areas 7a and 7b of a polarization control liquid crystal panel 7 are provided in correspondence to each lens portion 8a of a lenticular lens 8, similarly to those in the stereoscopic image display mode according to the first embodiment shown in FIG. 7. In other words, the image display 1 changes application/nonapplication of voltage every two electrodes 7d of the polarization control liquid crystal panel 7, thereby constituting each of the polarization control areas 7a and 7b of the polarization control liquid crystal panel 7 of two unit areas 7c (see FIG. 3).

Figure 12:
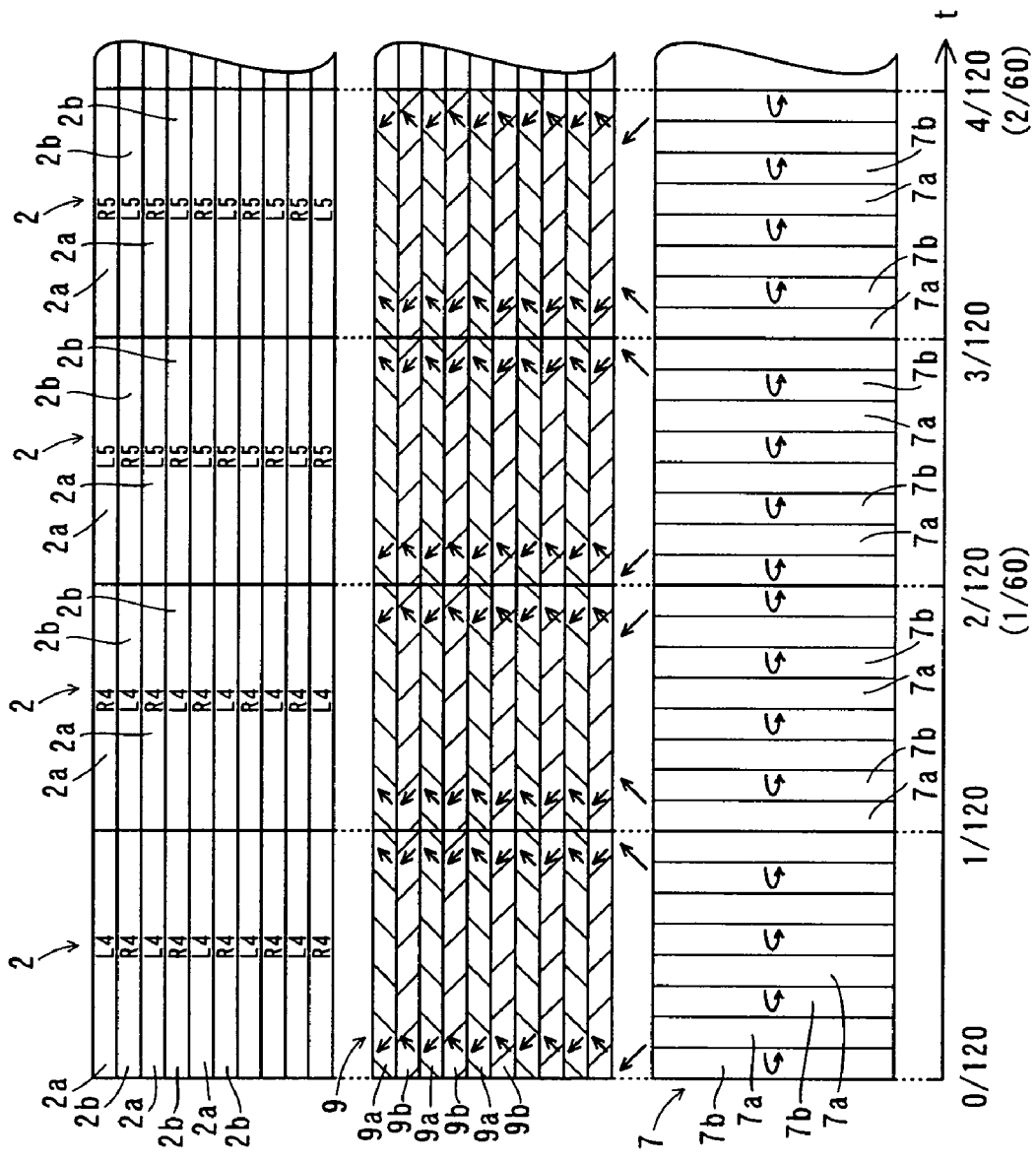
FIG. 12 illustrates a polarization control liquid crystal panel, a retardation plate and a display panel in a stereoscopic image display mode with small image deterioration in an image display according to a modification of the first embodiment of the present invention shown in FIG. 1.

In the stereoscopic image display method according to the modification of the first embodiment, the image display 1 controls a display panel 2 to switch left- and right-eye images displayed on pixel trains 2a and 2b thereof respectively every $1/2$ frame period ($1/120$ seconds) of the display panel 2 by controlling application states on pixel electrodes (not shown) of the display panel 2, as shown in FIG. 12. In other words, the image display 1 displays left- and right-eye images L4 and R4 on the pixel trains 2a and 2b of the display panel 2 respectively in a period between $0/120$ and $1/120$ seconds. In a period between $1/120$ and $2/120$ seconds, on the other hand, the image display 1 displays the right- and left-eye images R4 and L4 on the pixel trains 2a and 2b of the display panel 2 respectively. In a period between $2/120$ and $3/120$ seconds, further, the image display 1 displays left- and right-eye images L5 and R5 on the pixel trains 2a and 2b of the display panel 2 respectively. In a period between $3/120$ and $4/120$ seconds, the image display 1 displays the right- and left-eye images R5 and L5 on the pixel trains 2a and 2b of the display panel 2 respectively. The image display 1 also subsequently displays left- and right-eye images in a switching manner every $1/120$ seconds.

Figure 13:
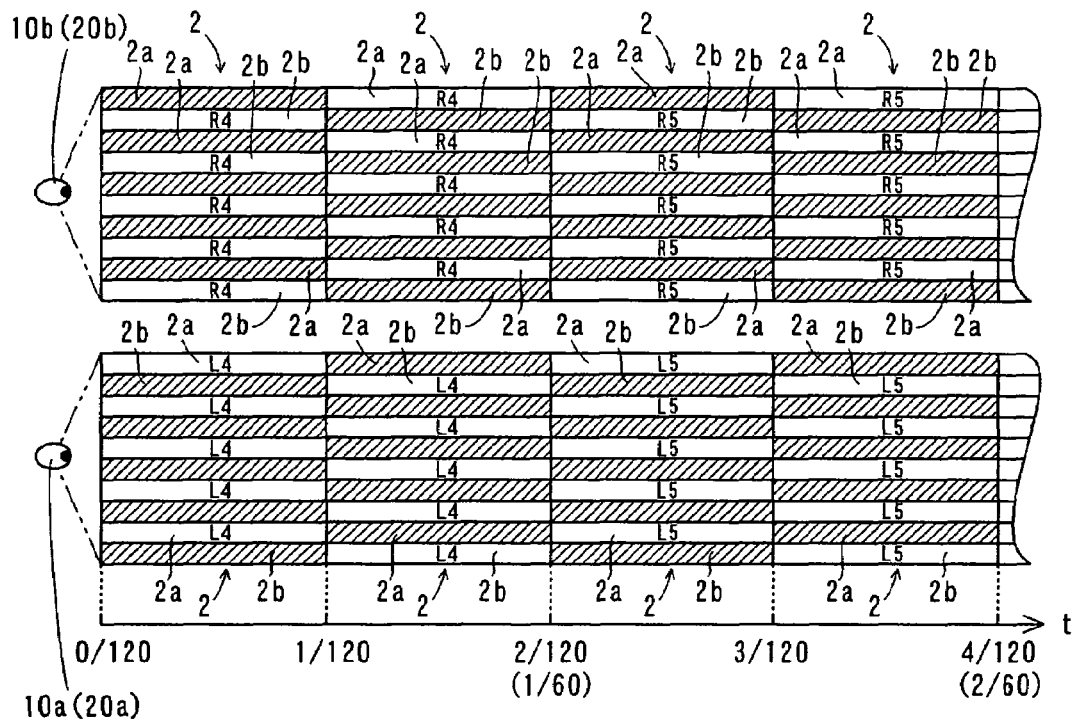
FIG. 13 is a diagram for illustrating areas of the display panel observed by observers in the stereoscopic image display mode with small image deterioration in the image display according to the modification of the first embodiment of the present invention shown in FIG. 1.

In the aforementioned structure, the image display 1 introduces the left- and right-eye images L4 and R4 displayed on the pixel trains 2a and 2b of the display panel 2 into left eyes 10a and 20a and right eyes 10b and 20b of observers 10 and 20 respectively in the period between $0/120$ and $1/120$ seconds, as shown in FIGS. 12 and 13. In the period between $1/120$ and $2/120$ seconds, the image display 1 switches the polarization control areas 7a and 7b of the polarization control liquid crystal panel 7 to transmit light directed to the left eyes 10a and 20a of the observers 10 and 20 through the polarization control areas 7b of the polarization control liquid crystal panel 7, thereby advancing the same toward a retardation plate 9 while changing the polarization axis thereof substantially by 90°. At this time, the image display 1 switches the left- and right-eye images L4 and R4 displayed on the pixel trains 2a and 2b of the display panel 2, thereby introducing the left-eye images L4 displayed on the pixel trains 2b of the display panel 2 into the left eyes 10a and 20a of the observers 10 and 20 while introducing the right-eye images R4 displayed on the pixel trains 2a of the display panel 2 into the right eyes 10b and 20b of the observers 10 and 20 respectively in the period between $1/120$ and $2/120$ seconds, as shown in FIG. 13.

In the period between $2/120$ and $3/120$ seconds, the image display 1 introduces the left-eye images L5 displayed on the pixel trains 2a of the display panel 2 into the left eyes 10a and 20a of the observers 10 and 20 while introducing the right-eye images R5 displayed on the pixel trains 2b of the display panel 2 into the right eyes 10b and 20b of the observers 10 and 20. In the period between $3/120$ and $4/120$ seconds, the image display 1 introduces the left-eye images L5 displayed on the pixel trains 2b of the display panel 2 into the left eyes 10a and 20a of the observers 10 and 20 while introducing the right-eye images R5 displayed on the pixel trains 2a of the display panel 2 into the right eyes 10b and 20b of the observer 10 and 20, similarly to the period between $1/120$ and $2/120$ seconds. Consequently, the right eyes 10b and 20b of the observers 10 and 20 can observe right-eye images displayed on all areas (pixel trains 2a and 2b) of the display panel 2 while the left eyes 10a and 20a of the observers 10 and 20 can observe left-eye images displayed on all areas (pixel trains 2a and 2b) of the display panel 2 in one frame period ($2/120$ seconds ($1/60$ seconds)), whereby the observers 10 and 20 can observe stereoscopic images having small image deterioration.

(Effects of First Embodiment)

According to the first embodiment, as hereinabove described, the image display 1, having the polarization control liquid crystal panel 7 for separating the light received from the backlight 5 through the polarizing plate 6 into light having the first polarization axis and light having the second polarization axis substantially perpendicular to the first polarization axis and the lenticular lens 8 provided between the polarization control liquid crystal panel 7 and the display panel 2 for advancing the light having different polarization axes through the polarization control liquid crystal panel 7 in prescribed directions respectively, can separate the light irradiated from the backlight 5 to advance toward the observers 10 and 20 located on different observational positions respectively before introducing the same into the display panel 2. Thus, the image display 1, capable of advancing the light toward the observers 10 and 20 regardless of the pixel pitch of the display panel 2 also when the display panel 2 is formed by a high-definition panel having a small pixel pitch, can provide different high-definition images to the observers 10 and 20 located on different observational positions respectively.

According to the first embodiment, the image display 1, provided with the lenticular lens 8 advancing the light separated by the polarization control liquid crystal panel 7 to have different polarization axes in the prescribed directions respectively, can suppress reduction of brightness of the light advancing toward the observers 10 and 20 by not blocking the light advancing toward the observers 10 and 20, dissimilarly to a case of advancing the light emitted from the display panel 2 through a member for limiting the same to advance to directions of prescribed angles. Thus, the image display 1 can inhibit the images from appearing dark.

According to the first embodiment, the image display 1, capable of separating the light having the first polarization axis and the light having the second polarization axis substantially perpendicular to the first polarization axis to advance toward the observers 10 and 20 located on different observational positions respectively through the lens portions 8a of the lenticular lens 8 due to the polarization control liquid crystal panel 7 provided with the polarization control areas 7a for transmitting the light having the first polarization axis and the polarization control areas 7b for converting the light having the first polarization axis into the light having the second polarization axis substantially perpendicular to the first polarization axis and the lenticular lens 8 provided with the substantially semicylindrical lens portions 8a in correspondence to the sets of the polarization control areas 7a and 7b respectively, can easily provide different images to the observers 10 and 20 located on different observational positions respectively.

According to the first embodiment, the image display 1 having the pixel trains 2a and 2b provided in correspondence to the transmissive areas 9a and the polarizing areas 9b of the retardation plate 9 extending in the direction G in FIG. 1 can introduce the light transited through the transmissive areas 9a of the retardation plate 9 into the pixel trains 2a of the display panel 2 and advance the same toward the observer 10 in a state holding the images L2 (see FIG. 4) displayed on the pixel trains 2a of the display panel 2. Further, the image display 1 can introduce the light transmitted through the polarizing area 9b into the pixel trains 2b of the display panel 2 and advance the same toward the observer 20 in a state holding the images R2 (see FIG. 4) displayed on the pixel trains 2a of the display panel 2. Thus, the image display 1 can easily provide different images to the observers 10 and 20 located on different observational positions respectively.

According to the first embodiment, the image display 1, having the polarization control liquid crystal panel 7 provided with the polarization control areas 7a for transmitting the light having the first polarization axis and the polarization control areas 7b for converting the light having the first polarization axis into the light having the second polarization axis substantially perpendicular to the first polarization axis alternately in the direction G to extend in the direction F in FIG. 1, can transmit the light received from the backlight 5 through the polarization control areas 7a of the polarization control liquid crystal panel 7 through liquid crystals located on the polarization control areas 7a of the polarization control liquid crystal panel 7 without changing the polarization axis thereof by applying voltage to the electrodes 7d of the polarization control areas 7a. Further, the image display 1 can transmit the light received from the backlight 5 through the polarization control areas 7b of the polarization control liquid crystal panel 7 while changing the polarization axis thereof substantially by 90° through liquid crystals positioned on the polarization control areas 7b of the polarization control liquid crystal panel 7 by applying no voltage to the electrodes 7d of the polarization control areas 7b. Thus, the image display 1 can easily control the polarization axis of the light irradiated from the backlight 5.

According to the first embodiment, the image display 1 capable of constituting each of the polarization control areas 7a and 7b, constituted of four electrodes 7d in the two-screen display mode, of two electrodes 7d by controlling application states on the plurality of electrodes 7d for controlling the polarization control areas 7a and 7b of the polarization control liquid crystal panel 7 thereby controlling the arrival area of the light irradiated from the backlight 5 can subdivide the polarization control areas 7a and 7b. Thus, the image display 1 can subdivide the arrival area of the light by introducing the light irradiated from the backlight 5 into the lens portions 8a of the lenticular lens 8 through the subdivided polarization control areas 7a and 7b. Therefore, the image display 1, capable of subdividing the arrival area of the light to correspond to the right and left eyes 10b and 10a (20b and 20a) of the observer 10 (20) respectively, can introduce images having binocular parallax into the left and right eyes 10a and 10b (20a and 20b) of the observer 10 (20). Thus, the image display 1 can provide stereoscopic images to the observers 10 and 20 located on different observational positions respectively.

Second Embodiment

Figure 14:
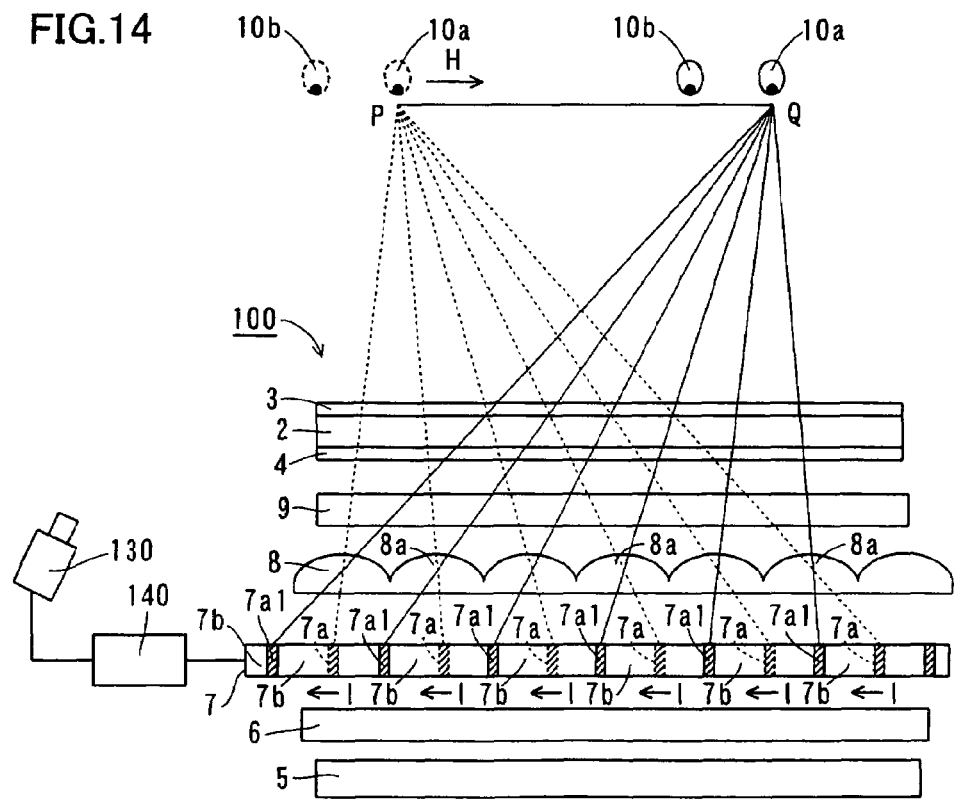
FIG. 14 is a diagram showing a display panel observed by observers from above for illustrating the structure of an image display according to a second embodiment of the present invention.

Referring to FIGS. 3 and 14, an image display 100 according to a second embodiment of the present invention varies display positions of stereoscopic images with movement of the observational position of an observer 10, dissimilarly to the aforementioned first embodiment.

As shown in FIG. 14, the image display 100 according to the second embodiment comprises a position sensor 130 for sensing the position of the observer 10 and a control portion 140 for moving polarization control areas 7a and 7b of a polarization control liquid crystal panel 7 by controlling application states on electrodes 7d thereof. The position sensor 130 is an example of the "position sensing means" in the present invention. According to the second embodiment, the image sensor 1 constitutes each polarization control area 7a of a unit area 7c (see FIG. 3) by controlling application states on the electrodes 7d (see FIG. 3) of the polarization control liquid crystal panel 7 thereby switching to a mode (head tracking mode) of varying display positions of stereoscopic images following movement of the observational position of the observer 10. The polarization control areas 7b of the polarization control liquid crystal panel 7 are constituted of unit areas 7c other than those constituting the polarization control areas 7a. The remaining structure of the second embodiment is similar to that of the aforementioned first embodiment.

The image display 100 according to the second embodiment having the aforementioned structure is described with reference to a case where the observer 10 moves along arrow H (from a position P to another position Q in FIG. 14) in FIG. 14. In this case, the position sensor 130 senses the movement of the observational position of the observer 10 along arrow H in FIG. 14. Then, the position sensor 130 transmits movement sensing information to the control portion 140. On the basis of this movement sensing information, the control portion 140 moves the polarization control areas 7a of the polarization control liquid crystal panel 7 to the positions of polarization control areas 7a1 along arrow I in FIG. 14, for introducing light transmitted through the polarization control areas 7a into the left eye 10a of the observer 10.

(Effects of Second Embodiment)

According to the second embodiment, as hereinabove described, the image sensor 100 provided with the position sensor 130 for sensing the position of the observer 10 and the control portion 140 for moving the polarization control areas 7a and 7b of the polarization control liquid crystal panel 7 in response to the position of the observer 10 sensed by the position sensor 130 can sense movement of the observer 10 with the position sensor 130 and move the polarization control areas 7a and 7b of the polarization control liquid crystal panel 7 on the basis of the movement sensing information. Thus, the image sensor 100 can provide proper images to the observer 10 also when the observer 10 moves. When the position sensor 130 according to the aforementioned second embodiment is enabled to sense movement of a plurality of observers through image recognition or the like and the control portion 140 is enabled to individually move the polarization control areas 7a and 7b corresponding to the plurality of observers, the image display 100 can provide proper stereoscopic images to the observers also when the plurality of observers move.

Third Embodiment

With reference to FIGS. 2 and 15 to 19, an image display 200 according to a third embodiment of the present invention is described with reference to a method of providing proper orthoscopic images to observers 10 and 20 dissimilarly to the aforementioned first embodiment.

Figure 15:
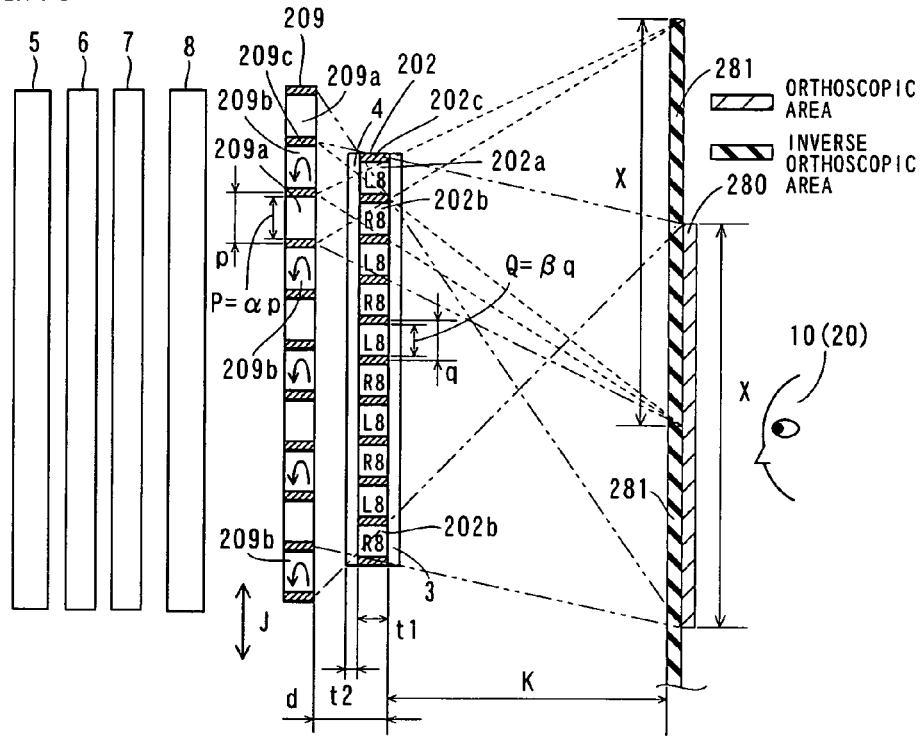
FIG. 15 is a diagram showing a display panel observed by an observer from a side portion in an image display according to a third embodiment of the present invention.

As shown in FIG. 15, the image display 200 according to the third embodiment comprises a display panel 202 for displaying images, polarizing plates 3 and 4 arranged to hold the display panel 20 therebetween, a backlight 5 for irradiating light toward the display panel 202 and still another polarizing plate 6 arranged on a side of the backlight 5 closer to the observers 10 and 20 (see FIG. 2). The display panel 202 is formed by a glass plate (refractive index n3=about 1.53) having a thickness t1 (e.g., about 0.7 mm). The polarizing plate 4 is formed by a resin plate (refractive index n4=about 1.49) having a thickness t2 (about 0.1 mm).

A retardation plate 209 is arranged between a lenticular lens 8 and the polarizing plate 4 mounted on the display panel 202. This retardation plate 209 includes transmissive areas 209a transmitting light having a first polarization axis and polarizing areas 209b for converting light having the first polarization axis into light having a second polarization axis. The retardation plate 209 is an example of the "first retardation plate" in the present invention, the transmissive areas 209a are examples of the "third polarization control area" in the present invention, and the polarizing areas 209b are examples of the "fourth polarization control area" in the present invention.

According to the third embodiment, shielding areas 209c are provided between the transmissive areas 209a and the polarizing areas 209b. The transmissive areas 209a, the polarizing areas 209b and the shielding areas 209c extend in a direction (parallel to lines connecting the left and right eyes of the observers 10 and 20 with each other) substantially perpendicular to a direction J in FIG. 15. Assuming that p represents the length of the transmissive areas 209a and the polarizing areas 209b of the retardation plate 209 in the direction J in FIG. 15 and $\alpha$ represents the numerical aperture in the direction J in FIG. 15, the transmissive areas 209a and the polarizing areas 209b have the following aperture length P in the direction J in FIG. 15:

$$P=\alpha \cdot p$$

The display panel 202 is provided with pixel trains 202a and 202b extending in the direction (parallel to the lines connecting the left and right eyes of the observers 10 and 20 with each other) substantially perpendicular to the direction J in FIG. 15. The pixel trains 202a and 202b correspond to the transmissive areas 209a and the polarizing areas 209b extending in the direction substantially perpendicular to the direction J of the retardation plate 209 respectively. The image display 200 displays images L8 and R8 to be observed by the observers 10 and 20 on the pixel trains 202a and 202b of the display panel 202 respectively. Assuming that q represents the length of the pixel trains 202a and 202b of the display panel 202 along the direction J in FIG. 15 and $\beta$ (0.78635) represents the numerical aperture in the direction J in FIG. 15, the pixel trains 202a and 202b have the following aperture length Q in the direction J in FIG. 15:

$$Q=\beta \cdot q (0.1498 \text{ mm})$$

According to the third embodiment, the image display 200 has shielding members 202c provided between the pixel trains 202a and 202b of the display panel 202, in addition to the shielding areas 209c provided on the retardation plate 209. The shielding members 202c extend in the direction (parallel to the lines connecting the left and right eyes of the observers 10 and 20 with each other) substantially perpendicular to the direction J in FIG. 15.

It is assumed that the observers 10 and 20 observe the image display 200 from positions separated from the display panel 202 by an observational distance K (750 mm). The distance d between the display panel 202 and the retardation plate 209 is calculated by air-converting thicknesses t1 and t2 of the display panel 202 and the polarizing plate 4 as follows:

$$d=t1/n3+t2/n4=0.5246 \text{(mm)}$$

While FIG. 15 illustrates the polarizing plate 4 and the retardation plate 209 with a space, no space is present between the polarizing plate 4 and the retardation plate 209 in practice. Light transmitted through the transmissive areas 209a (polarizing areas 209b) of the retardation plate 209 as well as the pixel trains 202a (pixel trains 202b) of the display panel 202 forms an orthoscopic area 280 having a length X on a position separated by the observational distance K. Similarly, light transmitted through the transmissive areas 209a (polarizing areas 209b) of the retardation plate 209 as well as the pixel trains 202b (pixel trains 202a) of the display panel 202 forms an inverse orthoscopic area 281 having the length X on a position separated by the observational distance K.

A case where the retardation plate 209 is provided with no shielding areas 209c and the display panel 202 is provided with no shielding members 202c ($\alpha=1$ and $\beta=1$) is described with reference to FIG. 16.

Figure 16:
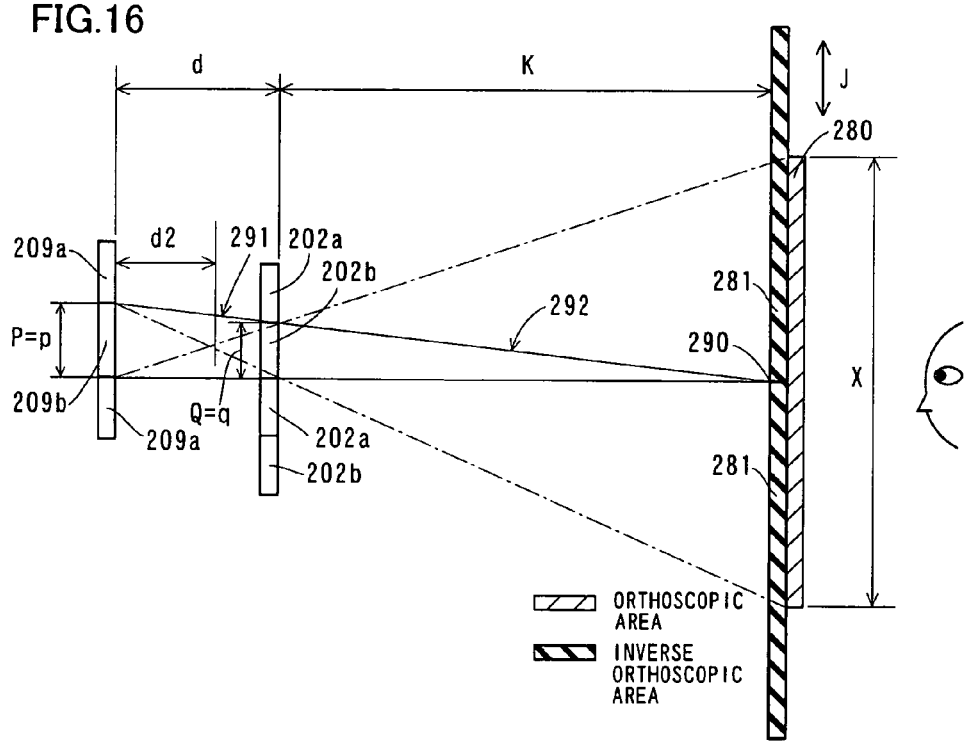
FIGS. 16 to 18 are diagrams showing the display panel observed by the observer from a side portion for illustrating the structure of the image display according to the third embodiment shown in FIG. 15.

In this case, the transmissive areas 209a and the polarizing areas 209b of the retardation plate 209 have the following length P in the direction J in FIG. 16:

$$P=p$$

The pixel trains 202a and 202b of the display panel 202 have the following length Q in the direction J in FIG. 16:

$$Q=q(0.1905 \text{ mm})$$

Referring to FIG. 16, the following expression is obtained from similarity between a triangle 291 including a base of the length p and an apex 290 and another triangle 292 including a base of the length q and the apex 290:

$$p:d+K=q:K \qquad (3)$$

This expression (3) is transformed into the following expression (4) as to p:

$$p=q(d+K)/K \qquad (4)$$

A case where the retardation plate 209 is provided with the shielding areas 209c and the display panel 202 is provided with no shielding members 202c ($0<\alpha<1$ and $\beta=1$) is described with reference to FIG. 17.

Figure 17:
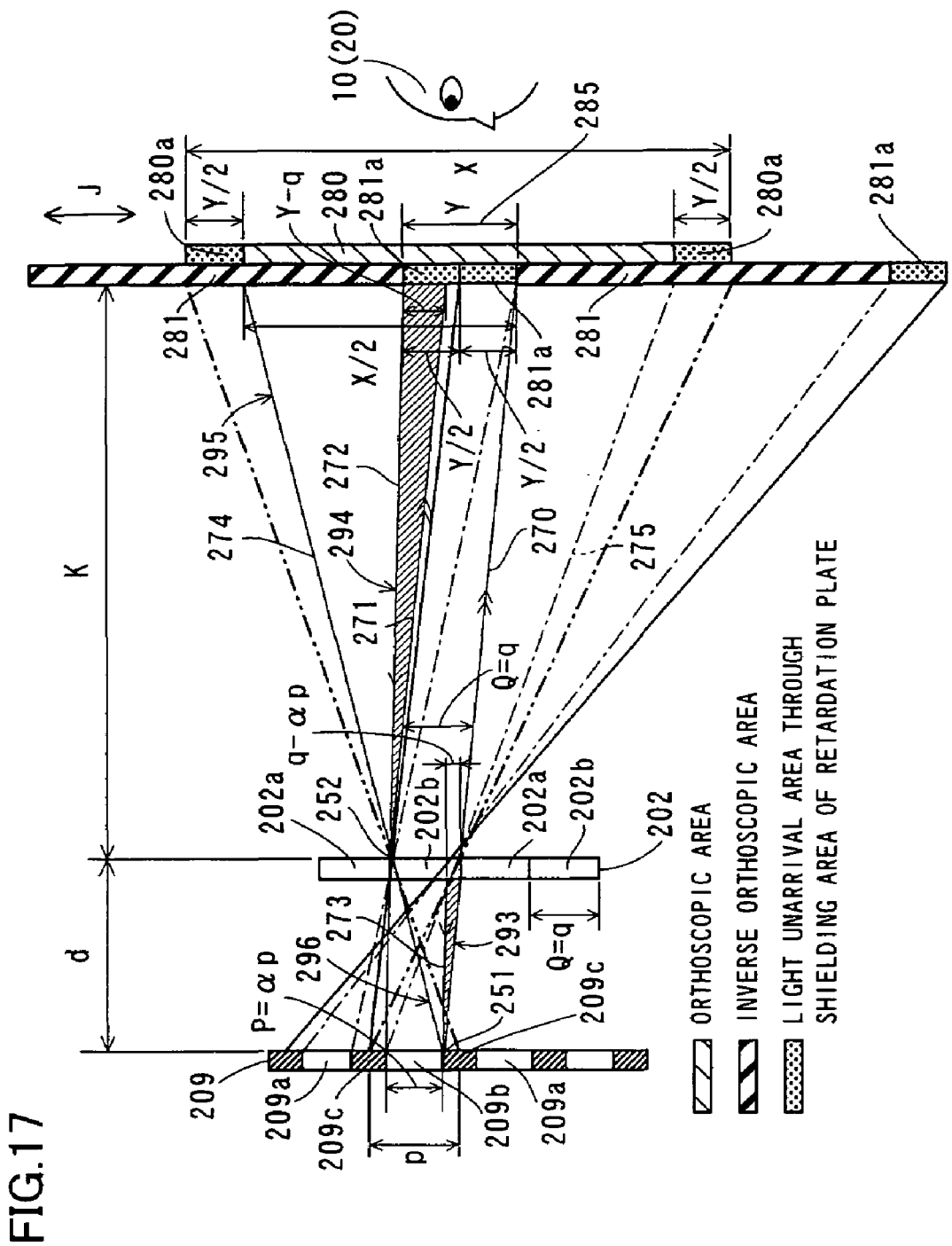

In this case, the transmissive areas 209a and the polarizing areas 209b of the retardation plate 209 have the following length (aperture length) P in the direction J in FIG. 17:

$$P=\alpha \cdot p$$

The pixel trains 202a and 202b of the display panel 202 have the following length (aperture length) Q in the direction J in FIG. 17:

$$Q=q(0.1905 \text{ mm})$$

The shielding areas 209c of the retardation plate 209 form light unarrival areas 280a and 281a where no light arrives on the orthoscopic and inverse orthoscopic areas 280 and 281 respectively. The light unarrival areas 281a formed on the inverse orthoscopic area 281 form a proper area 285 having a length Y where the observers 10 and 20 can observe only orthoscopic images. In other words, only orthoscopic images fall on the eyes of the observers 10 and 20 observing this proper area 285. An auxiliary line 271 parallel to a beam 270 passing through the lower ends of the polarizing areas 209b of the retardation plate 209 as well as the lower ends of the pixel trains 202b of the display panel 202 is drawn from the lower ends of the pixel trains 202a of the display panel 202. Another auxiliary line 273 parallel to another beam 272 passing through the upper ends of the polarizing areas 209b of the retardation plate 209 as well as the upper ends of the pixel trains 202b of the display panel 202 is drawn from the lower ends of the polarizing areas 209b of the retardation plate 209. Thus, the following expression (5) results from the similarity between a triangle (hatched area) 293 including the beam 270, the auxiliary line 273 and an apex 251 and another triangle (hatched area) 294 including the beam 272, the auxiliary line 271 and an apex 252, as shown in FIG. 17:

$$q - \alpha \cdot p : Y - q = d : K \tag{5}$$

Further, the following expression (6) results from similarity between a triangle 295 including still another beam 274 passing through the lower ends of the polarizing areas 209b of the retardation plate 209 and the upper ends of the pixel trains 202b of the display panel 202, the beam 270 and the apex 251 and another triangle 296 including a base of the length q and the apex 251:

$$q : d = X2 : K + d \tag{6}$$

The expressions (5) and (6) are transformed into the following expression (7) as to Y:

$$Y = X/2 - \alpha \cdot p \cdot K / d \tag{7}$$

The case where the retardation plate 209 is provided with the shielding areas 209c and the display 202 is provided with the shielding member 202c ($0 < \alpha < 1$ and $0 < \beta < 1$) (third embodiment) is described with reference to FIG. 18.

Figure 18:
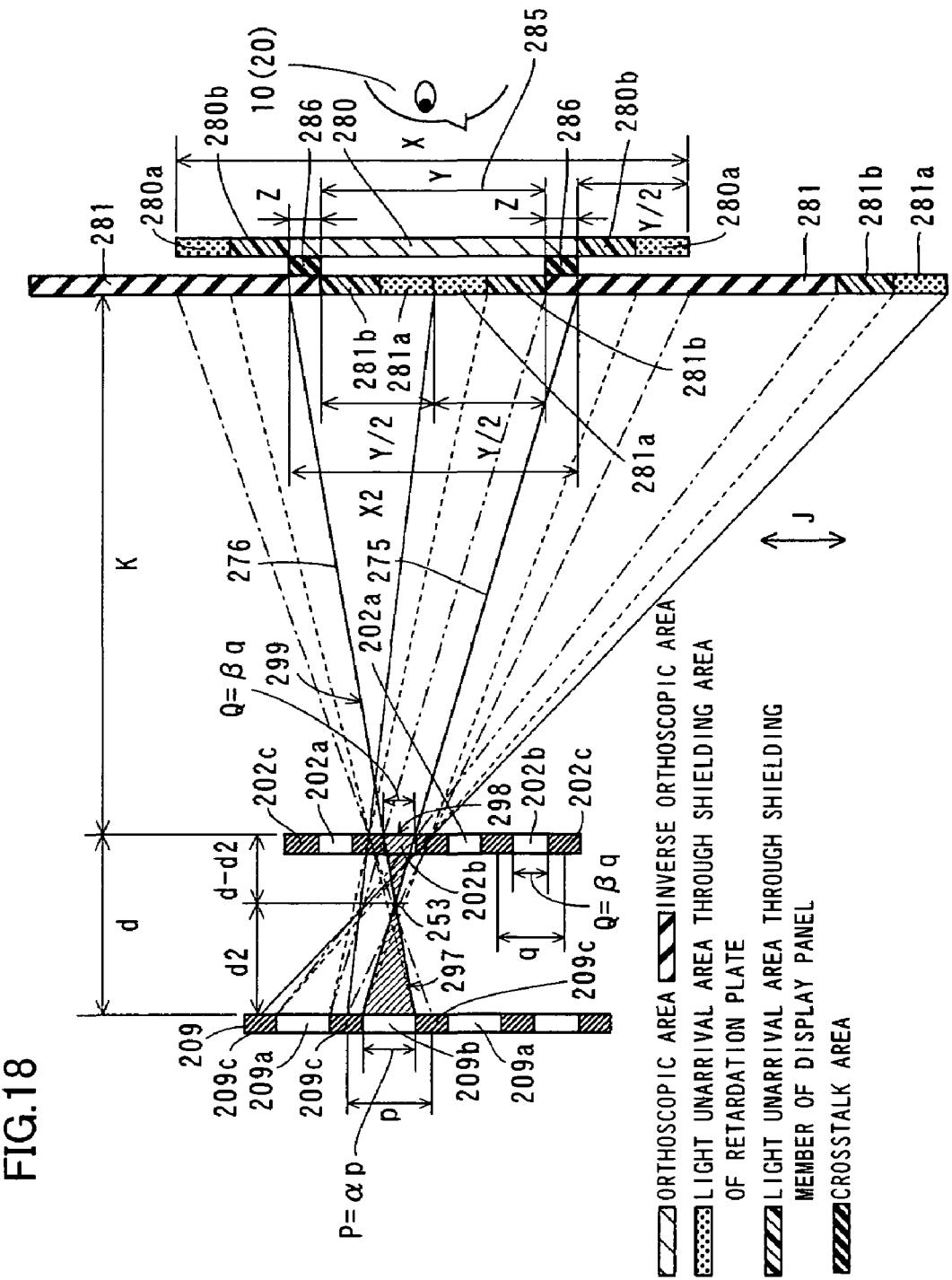

According to the third embodiment, the transmissive areas 209a and the polarizing areas 209b of the retardation plate 209 have the following length (aperture length) P in the direction J in FIG. 18:

$$P = \alpha \cdot p$$

Further, the pixel trains 202a and 202b of the display panel 202 have the following length (aperture length) Q in the direction J in FIG. 18:

$$Q = \beta \cdot q \, (0.1498 \text{ mm})$$

The shielding areas 209c of the retardation plate 209 form the light unarrival areas 280a and 281a where no light arrives on the orthoscopic and inverse orthoscopic areas 280 and 281 respectively. The shielding members 202c of the display panel 202 form light unarrival areas 280b and 281b where no light arrives on the orthoscopic and inverse orthoscopic areas 280 and 281 respectively. The light unarrival areas 281a and 281b formed on the inverse orthoscopic area 281 form the proper area 285 having the length Y where the observers 10 and 20 can observe only orthoscopic images. In other words, only orthoscopic images fall on the eyes of the observers 10 and 20 observing this proper area 285. Crosstalk areas 286 where the observers 10 and 20 observe both orthoscopic and inverse orthoscopic images are formed outside the light unarrival area 281b. These crosstalk areas 286 have a length Z in the direction J. It is assumed that X2 (Y+2Z) represents the total of the length Y of the proper area 285 and the lengths of the crosstalk areas 286 formed outside the proper area 285. Referring to FIG. 18, the following expression (8) results from similarity between a triangle (hatched area) 297 including a base of a length $\alpha \cdot p$ and an apex 253 and another triangle including a base of a length $\beta \cdot q$ and the apex 253:

$$\alpha \cdot p : d2 = \beta \cdot q : d - d2 \tag{8}$$

The following expression (9) results from similarity between the triangle (hatched area) 298 including the base of the length $\beta \cdot q$ and the apex 253 and still another triangle 299 including a base of a length X2 and the apex 253:

$$\beta \cdot q : d - d2 = X2 : K + d - d2 \tag{9}$$

where d2 represents the distance between the intersection (apex 253) between a beam 275 passing through the upper ends of the polarizing areas 209b of the retardation plate 209 as well as the lower ends of the pixel trains 202b of the display panel 202 and another beam 276 passing through the lower ends of the polarizing areas 209b of the retardation plate 209 as well as the upper ends of the pixel trains 202b of the display panel 202 and the retardation plate 209. The above expression (8) is transformed into the following expression (10) as to d2:

$$d2 = \alpha \cdot p \cdot d / (\alpha \cdot p + \beta \cdot q) \tag{10}$$

The above expression (10) is substituted for the above expression (9), to deduce the following expression (11):

$$X2 = (K + d)(\alpha \cdot p + \beta \cdot q) / d - \alpha \cdot p \tag{11}$$

The length Z of the crosstalk areas 286 formed outside the proper area 285 in the direction J, defined by 2Z=X2−Y, is expressed as follows:

$$Z = (X2 - Y)/2 \tag{12}$$

The crosstalk areas 286 are expressed as Y/2+Z+Y/2=X/2 as shown in FIG. 18, and hence the length Y of the proper area 285 is expressed as follows:

$$Y = X/2 - Z \tag{13}$$

In order to eliminate the crosstalk areas 286 having the length Z in the direction J, the length Z must be equal to 0 (Z=0), i.e., X2 must be equal to Y (X2=Y) and Y must be equal to X/2 (Y=X/2) in the above expressions (12) and (13). Therefore, X2=Y is substituted for the above expressions (6) and (11), which in turn are expanded for eliminating Y, to result in the following expression (14):

$$q(K+d)/d - (K+d)(\alpha \cdot p + \beta \cdot q)/d + \alpha \cdot p = 0 \tag{14}$$

Further, the above expression (14) is rearranged to result in the following expression (15):

$$q(K+d)(1-\beta) - \alpha \cdot p \cdot K = 0 \tag{15}$$

The above expression (4) is substituted for the above expression (15), to result in the following expression (16):

$$(1 - \alpha - \beta) p \cdot K = 0 \tag{16}$$

Since Y=X/2, an equality holds when X/2 and Y are added to the left and right sides of the expression (16) respectively, to deduce the following expression (17):

$$Y = (1 - \alpha - \beta) p \cdot K + X/2 \tag{17}$$

Figure 19:
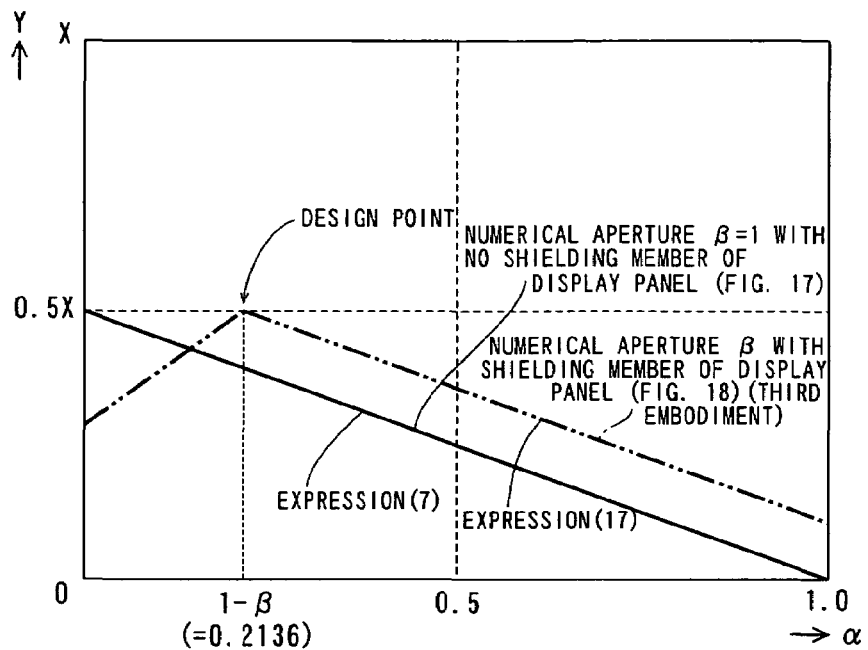
FIG. 19 is a graph showing change of a proper visual zone with respect to the numerical aperture of a retardation plate of the image display according to the third embodiment of the present invention shown in FIG. 15.

Since p and K are nonzero, $1 - \alpha - \beta = 0$. Hence, $\alpha = 1 - \beta$. In other words, the retardation plate 209 may be designed to have the following numerical aperture $\alpha$:

$$\alpha = 1 - \beta \, (\alpha = 0.2136)$$

with the numerical aperture $\beta$ of the display panel 202 in order to eliminate the crosstalk areas 286 in the structure of the third embodiment shown in FIGS. 15 and 18, as shown in a graph of FIG. 19. FIG. 19 shows a line (solid line) defined by the expression (7) corresponding to the structure having the retardation plate 209 provided with the shielding areas 209c and the display panel 202 provided with no shielding members 202c shown in FIG. 17 and a line (two-dot chain line) defined by the expression (17) corresponding o the structure of the third embodiment having the retardation plate 209 provided with the shielding areas 209c and the display panel 202 provided with the shielding members 202c shown in FIG. 18.

(Effects of Third Embodiment)

According to the third embodiment, as hereinabove described, the image display 200 can form the light unarrival areas 281a where no light arrives on the position of the orthoscopic area 281 for the observers 10 and 20 by providing the shielding areas 209c between the transmissive areas 209a and the polarizing areas 209b of the retardation plate 209. The observers 10 and 20 can observe the images for the observers 10 and 20 on these unarrival areas 281a respectively. Consequently, the image display 200 can inhibit the images for the observer 20 from entering the left and right eyes 10a and 10b of the observer 10 while inhibiting the images for the observer 10 from entering the left and right eyes 20a and 20b of the observer 20.

According to the third embodiment, the image display 200 provided with the shielding members 202c between the pixel trains 202a and 202b of the display panel 202 in addition to the shielding areas 209c provided on the retardation plate 209 can also form the light unarrival areas 281b on the position of the orthoscopic area 281 for the observers 10 and 20 in addition to the light unarrival areas 281a, thereby forming the light unarrival areas 281a and 281b having large lengths. Thus, the observers 10 and 20 can observe only the images for the observers 10 and 20 respectively on the long unarrival areas 281a and 281b, whereby the image display 200 can more effectively inhibit the images for the observer 20 from entering the left and right eyes 10a and 10b of the observer 10 while more effectively inhibiting the images for the observer 10 from entering the left and right eyes 20a and 20b of the observer 20.

Fourth Embodiment

Figure 20:
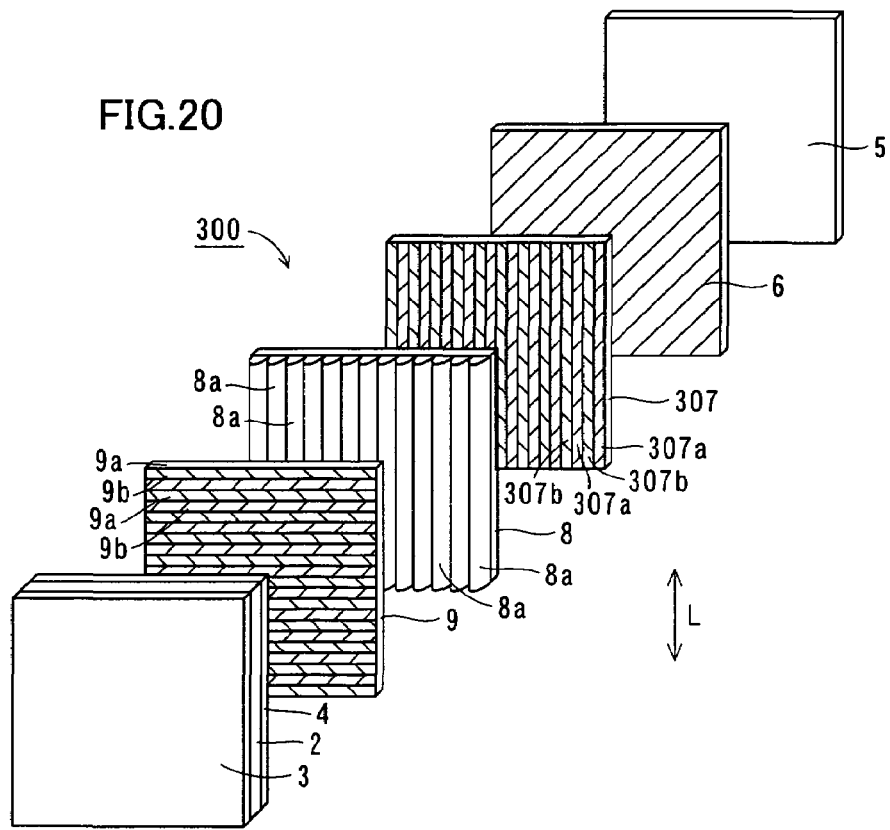
FIG. 20 is an exploded perspective view of an image display according to a fourth embodiment of the present invention.
Figure 21:
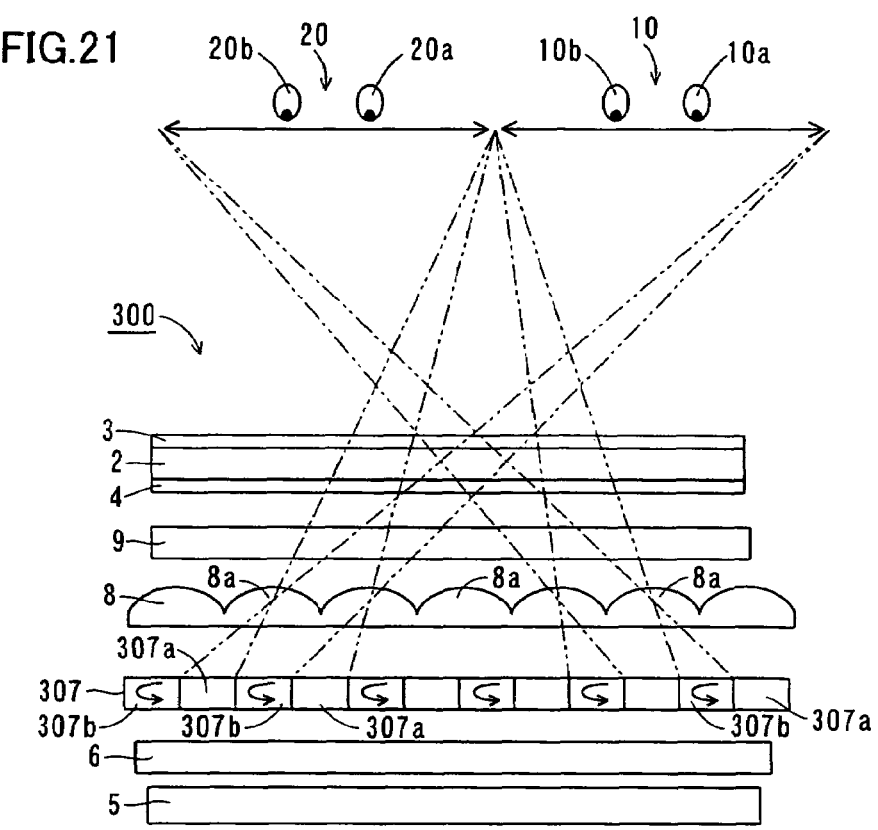
FIG. 21 is a diagram showing a display panel observed by observers from above for illustrating the principle of the image display according to the fourth embodiment of the present invention shown in FIG. 20.

Referring to FIGS. 20 and 21, an image display 300 according to a fourth embodiment of the present invention employs a retardation plate 307 in place of a polarization control liquid crystal panel in a structure similar to that according to the aforementioned first embodiment. The remaining structure of the image display 300 according to the fourth embodiment is similar to that of the image display 1 according to the first embodiment, and hence redundant description is not repeated.

In the image display 300 according to the fourth embodiment, the retardation plate 307 is arranged between a polarizing plate 6 and a lenticular lens 8, as shown in FIGS. 20 and 21. This retardation plate 307 has transmissive areas 307a for transmitting light having a first polarization axis received from a backlight 5 through the polarizing plate 6 and polarizing areas 307b for converting the light having the first polarization axis into light having a second polarization axis substantially perpendicular to the first polarization axis. The transmissive areas 307a and the polarizing areas 307b of the retardation plate 307 extend in a direction (direction L in FIG. 20) substantially perpendicular to a line segment connecting the left and right eyes 10a and 10b (20a and 20b) of an observer 10 (20) with each other alternately in a direction substantially perpendicular to the direction L in FIG. 20. The retardation plate 307 is an example of the "polarization axis control means" or the "second retardation plate" in the present invention. The transmissive areas 307a are examples of the "second polarization control area" in the present invention, and the polarizing areas 307b are examples of the "first polarization control area" in the present invention.

A two-screen display method of the image display 300 according to the fourth embodiment of the present invention is now described with reference to FIG. 21.

First, structures of the retardation plate 307 and a display panel 2 in a two-screen display mode for providing different images to the observers 10 and 20 located on different observational positions respectively are described. Each set of the transmissive and polarizing areas 307a and 307b of the retardation plate 307 is provided in correspondence to each lens portion 8a of the lenticular lens 8, as shown in FIG. 21.

In the aforementioned structure, the image display 300 transmits only the light having the first polarization axis received from the backlight 5 through the polarizing plate 6 arranged on a side of the backlight 5 closer to the observers 10 and 20 and advances the same toward the retardation plate 307. The image display 300 transmits the light having the first polarization axis through the transmissive areas 307a and the polarizing areas 307b of the retardation plate 307. At this time, the image display 300 transmits the light incident upon the transmissive areas 307a of the retardation plate 307 without changing the polarization axis thereof, and emits the light incident upon the polarizing areas 307b of the retardation plate 307 while changing the polarization axis thereof by 90°. Thereafter the image display 300 condenses the light emitted from the transmissive areas 307a with the first polarization axis through the lenticular lens 8, to advance the same toward the observer 10. The image display 300 further condenses the light transmitted through the polarizing areas 307b with the second polarization axis substantially perpendicular to the first polarization axis through the lenticular lens 8, to advance the same toward the observer 20. Thereafter the image display 300 operates similarly to the image display 1 according to the aforementioned first embodiment, and hence redundant description is not repeated.

(Effects of Fourth Embodiment)

According to the fourth embodiment, as hereinabove described, the image display 300, having the retardation plate 307 provided with the transmissive areas 307a transmitting the light having the first polarization axis and the polarizing areas 307b for converting the light having the first polarization axis into the light having the second polarization axis substantially perpendicular to the first polarization axis to extend in the direction L in FIG. 20 alternately in the direction substantially perpendicular to this direction L, can separate the light irradiated from the backlight 5 into those having different polarization axes with a simpler structure as compared with the case of employing the polarization control liquid crystal panel 7 in the aforementioned first embodiment.

Fifth Embodiment

Figure 22:
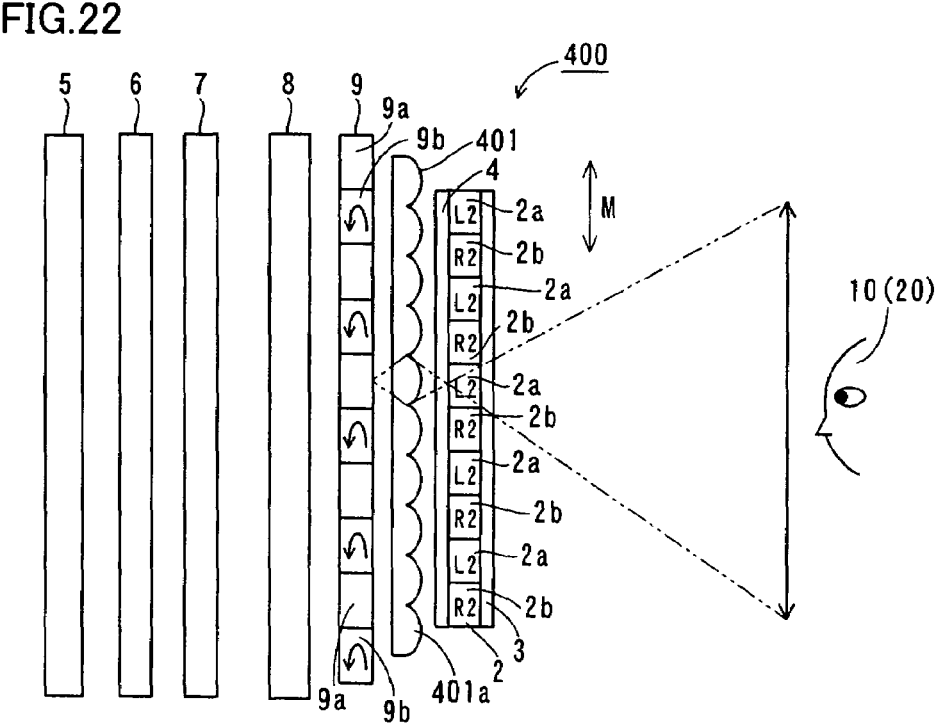
FIG. 22 is a diagram showing a display panel observed by observers from above for illustrating the principle of an image display according to a fourth embodiment of the present invention.

Referring to FIG. 22, an image display 400 according to a fifth embodiment of the present invention has a lenticular lens 401 arranged between a retardation plate 9 and a polarizing plate 4 mounted on a display panel 2 in a structure similar to that of the aforementioned first embodiment. The remaining structure of the fifth embodiment is similar to that of the aforementioned first embodiment, and hence redundant description is not repeated.

In the image display 400 according to the fifth embodiment, the lenticular lens 401 is arranged between the polarizing plate 4 mounted on the display panel 2 and the retardation plate 9, as shown in FIG. 22. This lenticular lens 401 is provided with a plurality of substantially semicylindrical lens portions 401a extending in a direction (perpendicular to the plane of FIG. 22) perpendicular to a direction M in FIG. 22. The lenticular lens 401 including these lens portions 401a has a function of guiding light emitted from transmissive areas 9a of the retardation plate 9 to pixel trains 20a of the display panel 2 while guiding light emitted from polarizing areas 9b of the retardation plate 9 to pixel trains 2b of the display panel 2. The lenticular lens 401 is an example of the "second lenticular lens" in the present invention, and the lens portions 401*a* are examples of the "second lens portion" in the present invention.

(Effects of Fifth Embodiment)

According to the fifth embodiment, as hereinabove described, the image display 400, provided with the lenticular lens 401 formed with the substantially semicylindrical lens portions 401*a* extending in the direction substantially perpendicular to the direction M in FIG. 22 between the polarizing plate 4 mounted on the display panel 2 and the retardation plate 9, can introduce light transmitted through the transmissive areas 9*a* of the retardation plate 9 into the pixel trains 2*a* of the display panel 2 through the lens portions 401*a* of the lenticular lens 401 while introducing light transmitted through the polarizing areas 9*b* of the retardation plate 9 into the pixel trains 2*b* of the display panel 2 by condensing the same through the lens portions 401*b* of the lenticular lens 401. Consequently, the image display 400 can easily suppress provision of images different from those to be observed to the observers 10 and 20.

Although the present invention has been described and illustrated in detail, it is clearly understood that the same is by way of illustration and example only and is not to be taken by way of limitation, the spirit and scope of the present invention being limited only by the terms of the appended claims.

Figure 23:
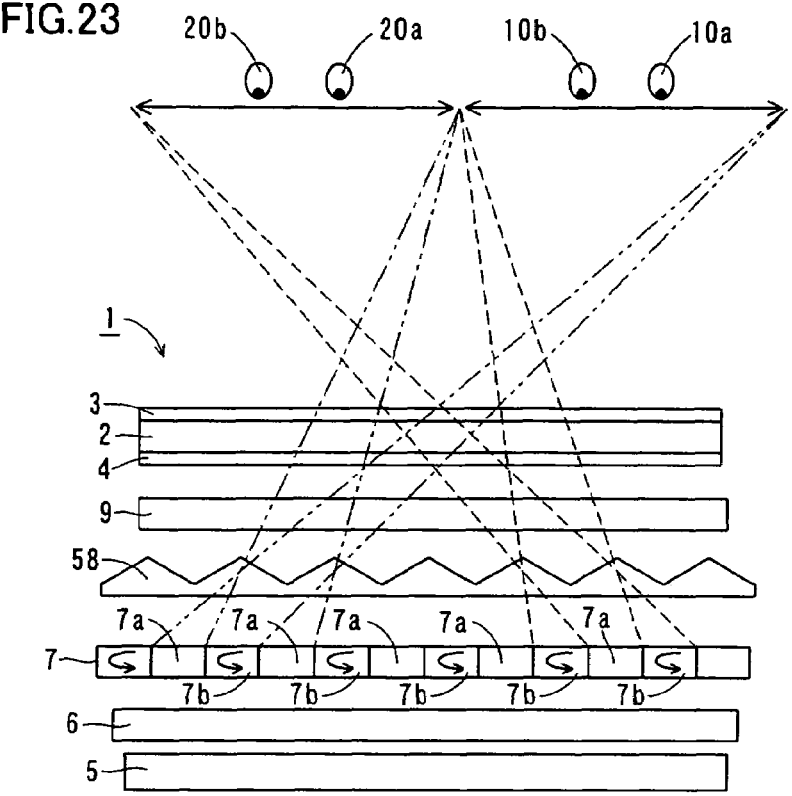
FIG. 23 is a diagram showing a display panel observed by observers from above for illustrating the principle of an image display according to another modification of the first embodiment of the present invention shown in FIG. 1.

For example, while the lenticular lens 8 is arranged between the polarization control liquid crystal panel 7 and the retardation plate 9 in the aforementioned first embodiment, the present invention is not restricted to this but a striped prism lens 58 formed by a plurality of lens portions extending in a direction (perpendicular to the plane of FIG. 23) perpendicular to a line segment connecting the left and right eyes of an observer with each other may be arranged between a polarization control liquid crystal panel 7 and a retardation plate 9, as in another modification of the first embodiment of the present invention shown in FIG. 23.

Figure 24:
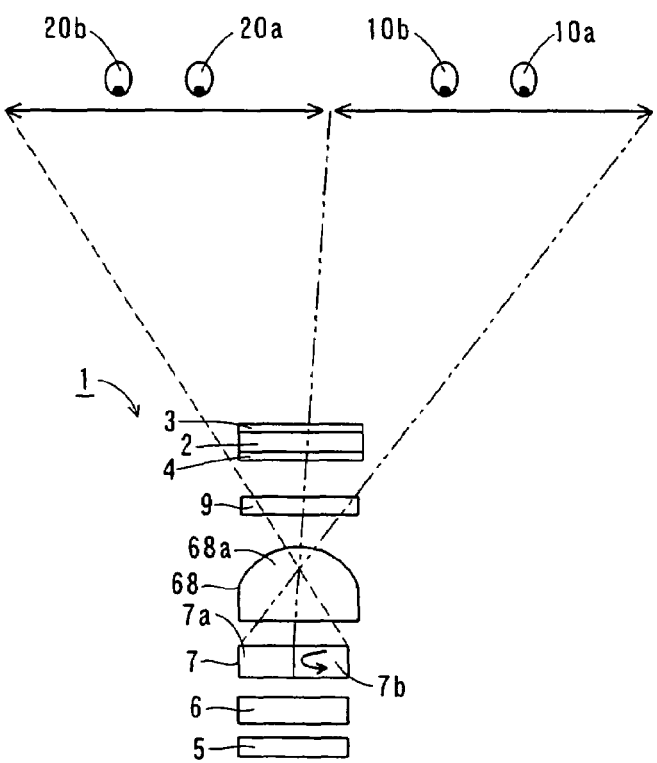
FIG. 24 is a diagram showing a display panel observed by observers from above for illustrating the principle of an image display according to still another modification of the first embodiment of the present invention shown in FIG. 1.

While the plurality of lens portions 8*a* of the lenticular lens 8 extend in the direction F in FIG. 1 in the aforementioned first embodiment, the present invention is not restricted to this but one lens portion 68*a* of a lenticular lens 68 may extend in a direction perpendicular to the plane of FIG. 24 as in still another modification of the first embodiment of the present invention shown in FIG. 24.

Figure 25:
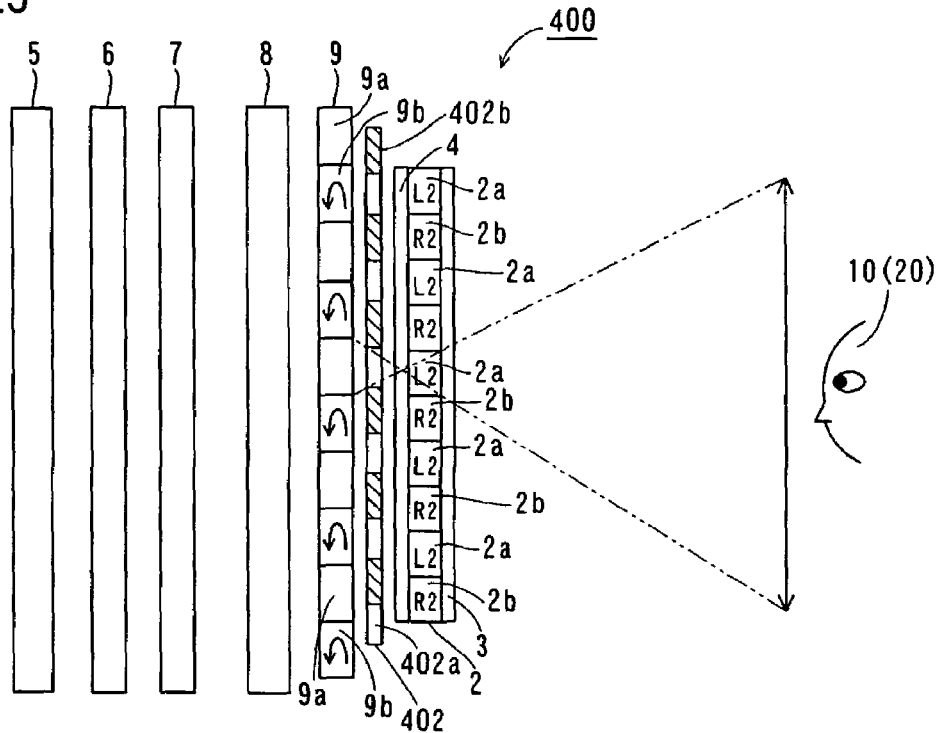
FIG. 25 is a diagram showing a display panel observed by observers from above for illustrating the principle of an image display according to a modification of the fifth embodiment of the present invention shown in FIG. 22.
Figure 26:
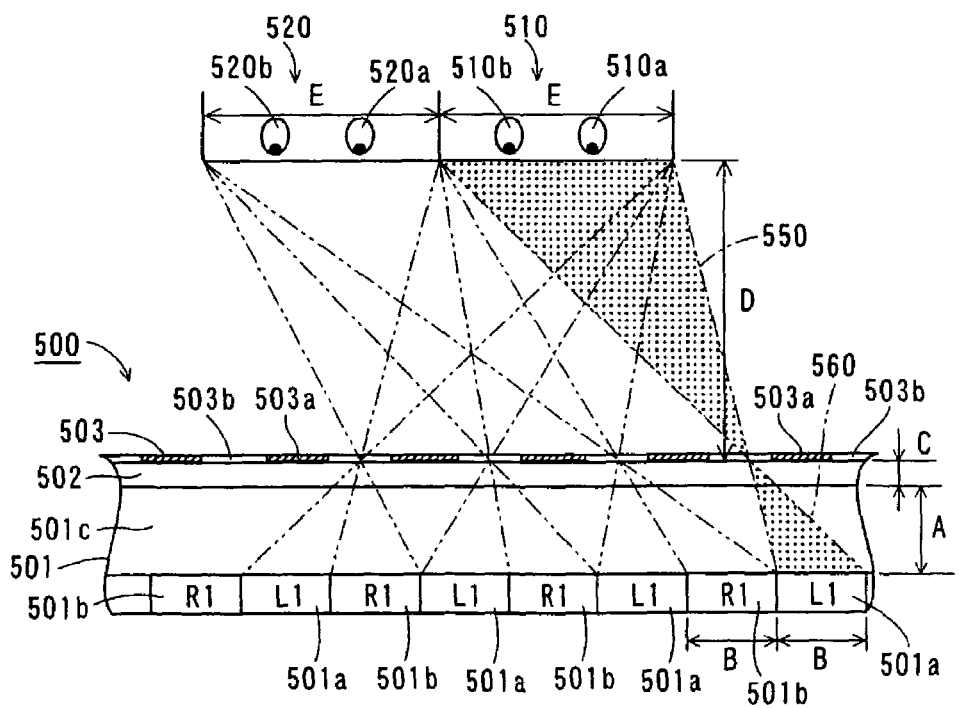
FIG. 26 is a diagram showing a display panel observed by observers from above for illustrating the principle of an exemplary conventional two-screen display employing a parallax barrier system.

While the lenticular lens 401 is arranged between the polarizing plate 4 mounted on the display panel 2 and the retardation plate 9 in the aforementioned fifth embodiment, the present invention is not restricted to this but a barrier 402 having openings 402*a* and shields 402*b* may be arranged between a polarizing plate 4 mounted on a display panel 2 and a retardation plate 9 in place of the lenticular lens 401, as in a modification of the fifth embodiment of the present invention shown in FIG. 25. In this case, the shields 402*b* of the barrier 402 must be formed to prevent light transmitted through transmissive areas 9*a* (polarizing areas 9*b*) of the retardation plate 9 from advancing toward observers 10 and 20 through pixel trains 2*b* (2*a*) of the display panel 2. Further, the openings 402*a* of the barrier 402 must be so formed that light transmitted through the transmissive areas 9*a* (polarizing areas 9*b*) of the retardation plate 9 advances toward the observers 10 and 20 through the pixel trains 2*a* (2*b*) of the display panel 2.

While the polarizing plates 3 and 4 arranged to hold the display panel 2 therebetween have polarization axes perpendicular to each other in the aforementioned first embodiment, the present invention is not restricted to this but the polarizing plates 3 and 4 arranged to hold the display panel 2 therebetween may alternatively be constituted of polarizing plates having the same polarization axes, for example, in response to the display mode of the display panel 2.

While the polarizing plate 4 arranged between the display panel 2 and the retardation plate 9 transmits the light having the first polarization axis and absorbs the light having the second polarization axis in the aforementioned first embodiment, the present invention is not restricted to this but the polarizing plate 4 may alternatively transmit light having a polarization axis other than the first polarization axis and absorb light having a polarization axis substantially perpendicular to the polarization axis other than the first polarization axis. While the polarizing plate 3 arranged on the side of the display panel 2 closer to the observers 10 and 20 transmits the light having the second polarization axis substantially perpendicular to the first polarization axis and absorbs the light having the first polarization axis in the first embodiment, the present invention is not restricted to this but the polarizing plate 3 may alternatively transmit light having a polarization axis other than the second polarization axis and absorb light having a polarization axis substantially perpendicular to the polarization axis other than the second polarization axis.

While the polarizing plate 6 arranged between the backlight 5 and the polarization control liquid crystal panel 7 transmits the light having the first polarization axis included in the light irradiated from the backlight 5 in the aforementioned first embodiment, the present invention is not restricted to this but the polarizing plate 6 arranged between the backlight 5 and the polarization control liquid crystal panel 7 may alternatively transmit light having a polarization axis other than the first polarization axis included in the light irradiated from the backlight 5.

While the image display 1 according to the aforementioned first embodiment emits the light passing through the polarization control areas 7*a* without changing the polarization axis thereof and emits the light passing through the polarization control areas 7*b* while changing the polarization axis thereof by 90° by applying voltage to the polarization control areas 7*a* while applying no voltage to the polarization control areas 7*b*, the present invention is not restricted to this but the image display 1 may alternatively emit the light passing through the polarization control areas 7*a* without changing the polarization axis thereof and emit the light passing through the polarization control areas 7*b* while changing the polarization axis thereof by 90° by applying no voltage to the polarization control areas 7*a* while applying voltage to the polarization control areas 7*b*. The image display 1 may further alternatively change the polarization axes of both of the light passing through the polarization control areas 7*a* and that passing through the polarization control areas 7*b* to cause phase difference of 90°.

While the image display 1 according to the aforementioned first embodiment switches the polarization control areas 7*a* and 7*b* of the polarization control liquid crystal panel 7 every ½ frame period in the planar image display mode with small image deterioration and the stereoscopic image display mode, the present invention is not restricted to this but the image display 1 may alternatively switch the polarization control areas 7*a* and 7*b* every 1/n (¼, for example) frame period (n: natural number of at least two), for example. When switching the polarization control areas 7*a* and 7*b* of the polarization control liquid crystal panel 7 every 1/n frame period in the stereoscopic image display mode, the image display 1 must also switch the right- and left-eye images displayed on the pixel trains 2*a* and 2*b* of the display panel 2 every 1/n frame period.

What is claimed is:

1. An image display comprising:
a display panel for displaying images;
a light source for irradiating light toward said display panel;
polarization axis control means arranged between said light source and said display panel for separating said light irradiated from said light source into light having a first polarization axis and another light having a second polarization axis different from said first polarization axis;
a lens, arranged between said polarization axis control means and said display panel to be directly adjacent to said polarization axis control means for advancing said light having said first polarization axis and said light having said second polarization axis separated by said polarization axis control means in prescribed directions respectively, including at least one lens portion formed to extend in a first direction intersecting with a line segment connecting the left and right eyes of an observer with each other; and
a first retardation plate arranged between said display panel and said lens to be adjacent to said display panel and said lens and provided with a third polarization control area for emitting light having a third polarization axis and a fourth polarization control area for emitting light having a fourth polarization axis different from said third polarization axis, both extending in a second direction intersecting with said first direction alternately in said first direction, wherein:
said display panel is provided with a first pixel train and a second pixel train both extending in said second direction alternately in said first direction,
said third polarization control area and said fourth polarization control area of said first retardation plate extending in said second direction are provided to correspond to said first pixel train and said second pixel train of said display panel extending in said second direction respectively,
said polarization axis control means is provided with a first polarization control area for emitting said light having said first polarization axis and a second polarization control area for emitting said light having said second polarization axis, both extending in said first direction alternately in said second direction intersecting with said first direction, and
said lens includes a first lenticular lens provided with a substantially semicylindrical first lens portion formed to extend in said first direction in correspondence to a set of said first polarization control area and said second polarization control area for advancing said light, having said first polarization axis emitted from said first polarization control area and said light having said second polarization axis emitted from said second polarization control area in said prescribed directions respectively.

2. The image display according to claim 1, wherein
a shielding area is provided between said third polarization control area and said fourth polarization control area of said first retardation plate extending in said second direction.

3. The image display according to claim 2, wherein
a shielding member is provided between said first pixel train and said second pixel train of said display panel.

4. The image display according to claim 1, wherein
said polarization axis control means includes a polarization control liquid crystal panel provided with a first polarization control area for emitting said light having said first polarization axis and a second polarization control area for emitting said light having said second polarization axis different from said first polarization axis, both extending in said first direction alternately in a second direction intersecting with said first direction.

5. The image display according to claim 4, wherein
said polarization control liquid crystal panel is provided with a plurality of electrodes for controlling said first polarization control area and said second polarization control area of said polarization control liquid crystal panel,
so that the image display switches a two-screen display mode for a planar image and a stereoscopic image display mode by controlling application states on said plurality of electrodes of said polarization control liquid crystal panel thereby controlling an arrival area of said light irradiated from said light source.

6. The image display according to claim 5 wherein
the first pixel train and the second pixel train both extending in said second direction alternately in said first direction to correspond to said third polarization control area and said fourth polarization control area of said first retardation plate respectively,
so that the image display controls said polarization control liquid crystal panel to provide a planar image to said observer by controlling application states on said plurality of electrodes of said polarization control liquid crystal panel thereby switching said first polarization control area and said second polarization control area of said polarization control liquid crystal panel every said 1/n frame period, wherein n is a natural number of at least two of said display panel.

7. The image display according to claim 6, controlling said display panel to provide a stereoscopic image to said observer by switching a left-eye image and a right-eye image displayed on a first pixel train and a second pixel train of said display panel every said 1/n frame period, wherein n is a natural number of at least two of said display panel in synchronization with switching between said first polarization control area and said second polarization control area of said polarization control liquid crystal panel.

8. The image display according to claim 7, wherein
said 1/n frame period is a ½ frame period.

9. The image display according to claim 5, wherein
a plurality of electrodes of said polarization control liquid crystal panel extend along said first direction respectively.

10. The image display according to claim 4, wherein
the image display further comprises:
position sensing means for sensing the position of said observer, and
a control portion for moving said first polarization control area and said second polarization control area of said polarization control liquid crystal panel in response to the position of said observer sensed by said position sensing means.

11. The image display according to claim 1, wherein
said polarization axis control means includes a second retardation plate provided with a first polarization control area for emitting said light having said first polarization axis and a second polarization control area for emitting said light having said second polarization axis different from said first polarization axis, both extending in said first direction alternately in a second direction intersecting with said first direction.

12. The image display according to claim 1, wherein
said polarization axis control means includes a polarization control liquid crystal panel provided with a first polarization control area for emitting said light having said first polarization axis and a second polarization control area for emitting said light having said second polarization axis different from said first polarization axis, both extending in said first direction alternately in a second direction intersecting with said first direction,
so that the image display provides different planar images to observers located on different observational positions and provides stereoscopic images to said observers by changing the lengths and the positions of said first polarization control area and said second polarization control area of said polarization control liquid crystal panel in said second direction thereby controlling an arrival position of said light advanced through said first polarization control area and said second polarization control area and said lens.

13. The image display according to claim 1, further comprising a first polarizing plate arranged between said first retardation plate and said display panel for transmitting either said light having said third polarization axis or said light having said fourth polarization axis.

14. The image display according to claim 13, further comprising a second polarizing plate arranged between said light source and said polarization axis control means for transmitting light having either said first polarization axis or said second polarization axis.

* * * * *